(12) United States Patent
Yu et al.

(10) Patent No.: US 12,742,948 B2
(45) Date of Patent: Sep. 22, 2026

(54) CAMERA OPTICAL LENS

(71) Applicant: AAC Optics (Suzhou) Co., Ltd., Suzhou (CN)

(72) Inventors: Renlong Yu, Suzhou (CN); Shunda Zhou, Suzhou (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 314 days.

(21) Appl. No.: 18/391,581

(22) Filed: Dec. 20, 2023

(65) Prior Publication Data

US 2024/0411110 A1 Dec. 12, 2024

(30) Foreign Application Priority Data

Jun. 8, 2023 (CN) ......................... 202310675509.5

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ...... G02B 13/0045; G02B 9/64; G02B 13/00; G02B 13/06
See application file for complete search history.

(56) References Cited

U.S. PATENT DOCUMENTS

| | | | | |
|---|---|---|---|---|
| 11,940,601 B2 * | 3/2024 | Wang | ................. | G02B 13/0045 |
| 2022/0276466 A1 * | 9/2022 | Chen | .................. | G02B 13/0045 |
| 2024/0288665 A1 * | 8/2024 | Uno | ....................... | G02B 13/18 |
| 2025/0102773 A1 * | 3/2025 | Chen | ...................... | G02B 13/04 |

OTHER PUBLICATIONS

Yaba "Optimization in Lens Design" (Year: 2018).*
Gross "Handbook of Optical Systems" (Year: 2005).*

* cited by examiner

*Primary Examiner* — Bumsuk Won
*Assistant Examiner* — John C Sipes
(74) *Attorney, Agent, or Firm* — Viersch Law Group

(57) ABSTRACT

The present application relates to the field of optical lenses and discloses a camera optical lens, including, in order from an objective surface to an image surface: a first lens, a second lens, a third lens, a fourth lens, a fifth lens, a sixth lens, and a seventh lens. The following relationship expressions are satisfied: $0.95 \le f4/f \le 1.40$; $0.30 \le d11/d12 \le 1.00$; $3.00 \le R1/R2 \le 12.00$; $1.20 \le (R9+R10)/(R9-R10) \le 3.20$. The camera optical lens has excellent optical performance while satisfying the design requirements of large aperture and ultra-wide angle.

13 Claims, 16 Drawing Sheets

Field Curvature

Field of view (°)

72.2
60.0
40.0
20.0
0

T
S
555.0nm

-0.05 0 0.05

Millimeter

Distortion

Field of view (°)

72.2
60.0
40.0
20.0
0

555.0nm

-100.0 0 100.0

Percentage

CAMERA OPTICAL LENS

TECHNICAL FIELD

The present application relates to the field of optical lenses, in particular to a camera optical lens applicable to handheld terminal devices such as smartphones, digital cameras, and sports cameras, as well as camera devices such as monitors, and PC lenses.

BACKGROUND

In recent years, with the rise of smartphones, the demand for compact camera lenses has been increasing. Typically, camera lenses use photosensitive devices, either Charge Coupled Devices (CCD) or Complementary Metal-Oxide-Semiconductor Sensors (CMOS Sensors). Due to the advancements in semiconductor manufacturing technology, the pixel size of photosensitive devices has been reduced. Combined with the current trend in electronic products favoring excellent functionality in a compact and light-weight form, small-sized camera lenses with excellent imaging quality have unmistakably become mainstream in today's market. To achieve optimal imaging quality, conventional lenses used in smartphone cameras often adopt three-element or four-element lens structures. With the ongoing technological advancements and the increasing diversity of user demands, lens designs incorporating five, six, or seven elements have gradually become prevalent. There is an urgent need for wide-angle camera lenses with excellent optical characteristics, ultra-thin designs, and efficient correction of chromatic aberrations.

SUMMARY

In response to the above problems, an object of the present application is to provide a camera optical lens capable of satisfying the requirements of ultra-wide angle while obtaining a large aperture with good imaging performance.

In order to solve the above technical problems, an embodiment of the present application provides a camera optical lens, comprising in order from an objective side to an image side:

- a first lens having a negative refractive force;
- a second lens having a negative refractive force;
- a third lens having a positive refractive force;
- a fourth lens having a positive refractive force;
- a fifth lens having a negative refractive force;
- a sixth lens having a positive refractive force; and
- a seventh lens having a negative refractive force;
- a focal length of the camera optical lens is f; a focal length of the fourth lens is f4; an on-axis thickness of the sixth lens is d11; an on-axis distance from an image surface of the sixth lens to an objective surface of the seventh lens is d12; a radius of curvature of an objective surface of the first lens is R1; a radius of curvature of an image surface of the first lens is R2; a radius of curvature of an objective surface of the fifth lens is R9; a radius of curvature of an image surface of the fifth lens is R10, and the following relationship expressions are satisfied:

$$0.95 \le f4/f \le 1.40;$$

$$0.30 \le d11/d12 \le 1.00;$$

-continued $$3.00 \le R1/R2 \le 12.00;$$

$$1.20 \le (R9+R10)/(R9-R10) \le 3.20.$$

In one embodiment, an on-axis thickness of the fourth lens is d7; an on-axis distance from an image surface of the fourth lens to the objective surface of the fifth lens is d8, and the following relationship expression is satisfied:

$$8.00 \le d7/d8 \le 25.20.$$

In one embodiment, a focal length of the sixth lens is f6, and the following relationship expression is satisfied:

$$3.00 \le f6/f \le 8.00.$$

In one embodiment, the objective surface of the first lens is convex at a proximal-axis position, and an image surface of the first lens is concave at a proximal-axis position; a focal length of the first lens is f1, a radius of curvature of the objective surface of the first lens is R1; a radius of curvature of the image surface of the first lens is R2; an on-axis thickness of the first lens is d1; a total track length of the camera optical lens is TTL, and the following relationship expressions are satisfied:

$$-7.70 \le f1/f \le -1.95;$$

$$0.03 \le d1/TTL \le 0.75.$$

In one embodiment, an objective surface of the second lens is concave at a proximal-axis position, and an image surface of the second lens is concave at a proximal-axis position; a focal length of the second lens is f2; a radius of curvature of the objective surface of the second lens is R3; a radius of curvature of the image surface of the second lens is R4; an on-axis thickness of the second lens is d3; a total track length of the camera optical lens is TTL, and the following relationship expressions are satisfied:

$$-5.83 \le f2/f \le -1.23;$$

$$0.31 \le (R3+R4)/(R3-R4) \le 0.99;$$

$$0.05 \le d3/TTL \le 0.31.$$

In one embodiment, an objective surface of the third lens is convex at a proximal-axis position; a focal length of the third lens is f3; a radius of curvature of the objective surface of the third lens is R5; a radius of curvature of an image surface of the third lens is R6; an on-axis thickness of the third lens is d5; a total track length of the camera optical lens is TTL, and the following relationship expressions are satisfied:

$$0.72 \leq f3/f \leq 2.89;$$

$$-2.29 \leq (R5+R6)/(R5-R6) \leq -0.61;$$

$$0.05 \leq d5/TTL \leq 0.22.$$

In one embodiment, an objective surface of the fourth lens is convex at a proximal-axis position, and an image surface of the fourth lens is convex at a proximal-axis position; a radius of curvature of the objective surface of the fourth lens is R7, and a radius of curvature of the image surface of the fourth lens is R8; an on-axis thickness of the fourth lens is d7; a total track length of the camera optical lens is TTL, and the following relationship expressions are satisfied:

$$0.08 \leq (R7+R8)/(R7-R8) \leq 0.34;$$

$$0.02 \leq d7/TTL \leq 0.11.$$

In one embodiment, the objective surface of the fifth lens is convex at a proximal-axis position, and the image surface of the fifth lens is concave at a proximal-axis position; a focal length of the fifth lens is f5; an on-axis thickness of the fifth lens is d9; a total track length of the camera optical lens is TTL, and the following relationship expressions are satisfied:

$$-7.29 \leq f5/f \leq -1.06;$$

$$0.01 < d9/TTL < 0.04.$$

In one embodiment, the image surface of the sixth lens is convex at a proximal-axis position; a radius of curvature of an objective surface of the sixth lens is R11; a radius of curvature of the image surface of the sixth lens is R12; a total track length of the camera optical lens is TTL, and the following relationship expressions are satisfied:

$$-0.34 \leq (R11+R12)/(R11-R12) \leq 4.55;$$

$$0.01 \leq d11/TTL \leq 0.08.$$

In one embodiment, the objective surface of the seventh lens is convex at a proximal-axis position, and an image surface of the seventh lens is concave at a proximal-axis position; a focal length of the seventh lens is f7; a radius of curvature of the objective surface of the seventh lens is R13; the radius of curvature of the image surface of the seventh lens is R14; an on-axis thickness of the seventh lens is d13; a total track length of the camera optical lens is TTL, and the following relationship expressions are satisfied:

$$-7.64 \leq f7/f \leq -1.18;$$

$$0.91 \leq (R13+R14)/(R13-R14) \leq 5.68;$$

$$0.01 \leq d13/TTL \leq 0.06.$$

In one embodiment, a field of view of the camera optical lens is FOV, and the following relationship expression is satisfied:

$$FOV \geq 130.00°.$$

In one embodiment, an aperture value of the camera optical lens is FNO, and the following relationship expression is satisfied:

$$FNO \leq 2.6.$$

In one embodiment, the first lens is made of glass material.

In one embodiment, the fourth lens is made of glass material.

The beneficial effects of the present application lie in: the camera optical lens of the present application has excellent optical performance and satisfies the design requirements of large aperture and ultra-wide angle. It is particularly suitable for smartphone camera lens assemblies and WEB camera lenses including high-pixel camera elements such as CCD, CMOS, and the like.

DETAILED DESCRIPTION OF THE EMBODIMENTS

In order to make the objects, technical solutions, and advantages of the present application clearer, various embodiments of the present application will be described in detail below in connection with the accompanying drawings. However, those of ordinary skill in the art can understand that in the various embodiments of the present application, a number of technical details have been proposed in order to enable the reader to better understand the present application, and even without these technical details and various variations and modifications based on the following various embodiments, the technical solution claimed to be protected by the present application can be realized.

First Embodiment

Figure 1:
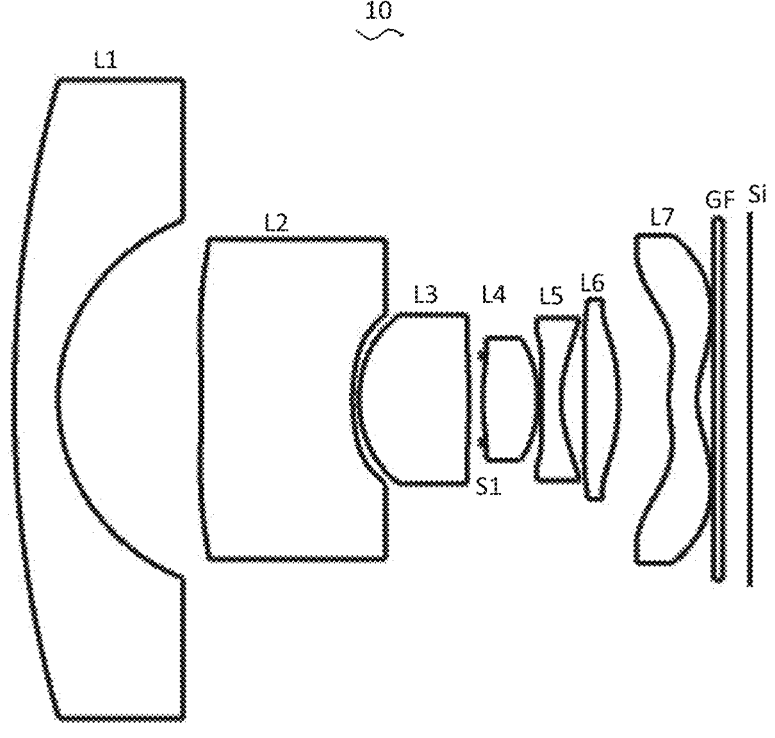
FIG. 1 is a structural schematic diagram of a camera optical lens according to the first embodiment of the present application.
Figure 1:

As shown in the accompanying drawings, the present application provides a camera optical lens 10. FIG. 1 shows a camera optical lens 10 according to the first embodiment of the present application, and the camera optical lens 10 includes seven lenses. Specifically, the camera optical lens 10, in order from an objective side to an image side, includes a first lens L1, a second lens L2, a third lens L3, an aperture S1, a fourth lens L4, a fifth lens L5, a sixth lens L6, a seventh lens L7, and an image surface Si. An optical element such as an optical filter GF may be provided between the seventh lens L7 and the image surface Si.

In this embodiment, the first lens L1 and the fourth lens L4 are made of glass material. The second lens L2, the third lens L3, the fifth lens L5, the sixth lens L6, and the seventh lens L7 are made of plastic materials.

It is defined that a focal length of the entire camera optical lens is f, and a focal length of the fourth lens L4 is f4. $0.95 \leq f4/f \leq 1.40$, in which a ratio of the focal length of the fourth lens L4 to the total focal length of the system is specified, which effectively balances the amount of field curvature of the system, so that the field curvature of the center field of view is offset by less than 0.02 mm.

It is defined that an on-axis thickness of the sixth lens L6 is d11, and an on-axis distance from an image surface of the sixth lens L6 to an objective surface of the seventh lens L7 is d12. The following relationship expression is satisfied: $0.30 \leq d11/d12 \leq 1.00$, in which a ratio of a center thickness of the sixth lens L6 and an air spacing from the sixth lens L6 to the seventh lens L7 (i.e., the on-axis thickness of the sixth lens L6 to the air spacing of the sixth lens L7) is specified. Within the range of the relationship expression, it is conducive to reducing the difficulty of assembly in the actual production process.

It is defined that a radius of curvature of an objective surface of the first lens L1 is R1, and a radius of curvature of an image surface of the first lens L1 is R2. The following relationship expression is satisfied: $3.00 \leq R1/R2 \leq 12.00$, in which the shape of the first lens L1 is specified, which is conducive to buffering changes in the angle of incidence of light rays from a large angle of view, so that the light ray can propagate smoothly in an optical imaging mirror group. Besides, it facilitates the processing of the lenses and the lens assembly.

It is defined that a radius of curvature of an objective surface of the fifth lens L5 is R9, and a radius of curvature of an image surface of the fifth lens L5 is R10. The following relationship expression is satisfied: $1.20 \leq (R9+R10)/(R9-R10) \leq 3.20$, in which the shape of the fifth lens L5 is specified. Within the range of the relationship expression, the degree of deflection of the light rays passing through the lenses can be moderated, thereby correcting the chromatic aberration efficiently, in which the chromatic aberration $|LC| \leq 5.2$ μm.

In this embodiment, an on-axis thickness of the fourth lens L4 is d7, and an on-axis distance from an image surface of the fourth lens L4 to an objective surface of the fifth lens L5 is d8, and satisfies the following relationship expression: $8.00 \leq d7/d8 \leq 25.20$. A ratio of the center thickness of the fourth lens L4 to the air spacing from the fourth lens L4 to the fifth lens L5 is specified, which within the range of relationship expressions helps to compress the total length of the optical system.

In this embodiment, a focal length of the camera optical lens is f, and a focal length of the sixth lens L6 is f6. The following relationship expression is satisfied: $3.00 \leq f6/f \leq 8.00$, in which a ratio of the sixth lens L6 to the total focal length of the system is specified. By reasonably allocating the optical focal length of the distribution system, the system is made to have better imaging quality and lower sensitivity.

In this embodiment, it is defined that the focal length of the camera optical lens is f, and the focal length of the first lens L1 is f1. The following relationship expression is satisfied: $-7.70 \leq f1/f \leq -1.95$, in which a negative refractive force of the first lens L1 is specified. When the negative refractive force exceeds the upper limit of the specified value, although it is conducive to the lens developing towards ultra-thinness, the negative refractive force of the first lens L1 will be too strong, and it will be difficult to make up for the aberration and other problems. Besides, it is not conducive to the development of the lens toward wide-angle. On the contrary, when the lower limit is exceeded, the negative refractive force of the first lens L1 becomes too weak, and it is difficult for the lens to develop toward ultra-thinness. In an embodiment, $-4.82 \leq f1/f \leq -2.44$.

In this embodiment, the objective surface of the first lens L1 is convex at a proximal-axis position, the image surface thereof is concave at a proximal-axis position, and the first lens L1 has a negative refractive force.

It is defined that an on-axis thickness of the first lens L1 is d1 and a total track length of the camera optical lens is TTL. The following relationship expression is satisfied: $0.03 \leq d1/TTL \leq 0.75$, which is conducive to realizing ultra-thinness. In an embodiment, $0.04 \leq d1/TTL \leq 0.60$.

In this embodiment, it is defined that the focal length of the camera optical lens is f, and the focal length of the second lens L2 is f2. The following relationship expression is satisfied: $-5.83 \leq f2/f \leq -1.23$, which is conducive to the system's ability to obtain a well-balanced field curvature in order to efficiently improve the image quality. In an embodiment, $-3.64 \leq f2/f \leq -1.54$.

It is defined that a radius of curvature of an objective surface of the second lens L2 is R3, and a radius of curvature of an image surface of the second lens L2 is R4, the following relationship expression is satisfied: $0.31 \leq (R3+R4)/(R3-R4) \leq 0.99$, in which the shape of the second lens L2 is specified. Within the range, it is conducive to compensating for on-axis chromatic aberration with the development of lenses towards ultra-thin wide angle. In an embodiment, $0.50 \leq (R3+R4)/(R3-R4) \leq 0.79$.

In this embodiment, the objective surface of the second lens L2 is concave at a proximal-axis position, the image surface is concave at a proximal-axis position, and the second lens L2 has a negative refractive force.

It is defined that an on-axis thickness of the second lens L2 is d3, and a total track length of the camera optical lens is TTL. The following relationship expression is satisfied: $0.05 \leq d3/TTL \leq 0.31$, which is conducive to realizing ultra-thinness. In an embodiment, $0.09 \leq d3/TTL \leq 0.25$.

In this embodiment, the focal length of the camera optical lens is defined as f, and a focal length of the third lens L3 is f3. The following relationship expression is satisfied: $0.72 \leq f3/f \leq 2.89$. Through the reasonable distribution of the optical focal length, the system is made to have better imaging quality and lower sensitivity. In an embodiment, $1.15 \leq f3/f \leq 2.31$.

It is defined that a radius of curvature of an objective surface of the third lens L3 is R5, and a radius of curvature of an image surface of the third lens L3 is R6. The following relationship expression is satisfied: $-2.29 \leq (R5+R6)/(R5-R6) \leq -0.61$, in which the shape of the third lens L3 is specified. Within the range, it is conducive to compensating for the aberration of the off-axis drawing angle and other problems with the development towards ultra-thinness and wide-angle. In an embodiment, $-1.43 \leq (R5+R6)/(R5-R6) \leq -0.77$.

In this embodiment, the objective surface of the third lens L3 is convex at a proximal-axis position, the image surface is convex at a proximal-axis position, and the third lens L3 has a positive refractive force. In other embodiments, the image surface of the third lens L3 may also be set to other concave and convex distributions.

It is defined that an on-axis thickness of the third lens L3 is d5, and a total track length of the camera optical lens is TTL. The following relationship expression is satisfied: $0.05 \leq d5/TTL \leq 0.22$, which is conducive to realizing ultra-thinness. In an embodiment, $0.08 \leq d5/TTL \leq 0.18$.

In this embodiment, it is defined that a radius of curvature of an objective surface of the fourth lens L4 is R7, and a radius of curvature of an image surface of the fourth lens L4 is R8. The following relationship expression is satisfied: $0.08 \leq (R7+R8)/(R7-R8) \leq 0.34$, in which the shape of the fourth lens L4 is specified. Within the range, it is conducive to compensating for the aberration of the off-axis drawing angle and other problems with the development towards ultra-thinness and wide-angle. In an embodiment, $0.13 \leq (R7+R8)/(R7-R8) \leq 0.27$.

In this embodiment, the objective surface of the fourth lens L4 is convex at a proximal-axis position, the image surface is convex at a proximal-axis position, and the fourth lens L4 has a positive refractive force.

It is defined that an on-axis thickness of the fourth lens L4 is d7 and the total track length of the camera optical lens is TTL. The following relationship expression is satisfied: $0.02 \leq d7/TTL \leq 0.11$, which is conducive to realizing ultra-thinness. In an embodiment, $0.03 \leq d7/TTL \leq 0.09$.

In this embodiment, it is defined that the focal length of the camera optical lens is f, and the focal length of the fifth lens L5 is f5. The following relationship expression is satisfied: $-7.29 \leq f5/f \leq -1.06$, in which the negative refractive force of the fifth lens L5 is specified. When the negative refractive force exceeds the upper limit of the specified value, although it is conducive to the lens to be developed towards ultra-thinness, the negative refractive force of the fifth lens L5 will be too strong, and it is difficult to make up for the aberration and other problems. Besides, it is not conducive to the development of the lens toward wide-angle. On the contrary, when the lower limit is exceeded, the negative refractive force of the fifth lens L5 becomes too weak, and it is difficult for the lens to develop toward ultra-thinness. In an embodiment, $-4.55 \leq f5/f \leq -1.32$.

In this embodiment, the objective surface of the fifth lens L5 is convex at a proximal-axis position, the image surface is concave at a proximal-axis position, and the fifth lens L5 has a negative refractive force.

It is defined that an on-axis thickness of the fifth lens L5 is d9, and the total track length of the camera optical lens is TTL. The following relationship expression is satisfied: $0.01 \leq d9/TTL \leq 0.04$, which is conducive to realizing ultra-thinness. In an embodiment, $0.01 \leq d9/TTL \leq 0.03$.

In this embodiment, it is defined that a radius of curvature of an objective surface of the sixth lens L6 is R11, and a radius of curvature of the image surface of the sixth lens L6 is R12. The following relationship expression is satisfied: $-0.34 \leq (R11+R12)/(R11-R12) \leq 4.55$, in which the shape of the sixth lens L6 is specified. Within the range, it is conducive to compensating for the aberration of the off-axis drawing angle and other problems with the development towards ultra-thinness and wide-angle. In an embodiment, $-0.21 \leq (R11+R12)/(R11-R12) \leq 3.64$.

In this embodiment, the objective surface of the sixth lens L6 is convex at a proximal-axis position, the image surface is convex at a proximal-axis position, and the sixth lens L6 has a positive refractive force. In other embodiments, the objective surface of the sixth lens L6 may also be set to other concave and convex distributions.

It is defined that an on-axis thickness of the sixth lens L6 is d11, and the total track length of the camera optical lens is TTL. The following relationship expression is satisfied: $0.01 \leq d11/TTL \leq 0.08$, which is conducive to realizing ultra-thinness. In an embodiment, $0.01 \leq d11/TTL \leq 0.06$.

In this embodiment, it is defined that the focal length of the camera optical lens is f, and a focal length of the seventh lens L7 is f7. The following relationship expression is satisfied: $-7.64 \leq f7/f \leq -1.18$, in which the negative refractive force of the seventh lens L7 is specified. When the negative refractive force exceeds the upper limit of the specified value, although it is conducive to the lens developing towards ultra-thinness, the negative refractive force of the seventh lens L7 will be too strong, and it will be difficult to make up for the aberration and other problems. Besides, it is not conducive to the development of the lens toward wide-angle. On the contrary, when the lower limit is exceeded, the negative refractive force of the seventh lens L7 becomes too weak, and it is difficult for the lens to develop toward ultra-thinness. In an embodiment, 4.77≤f7/f≤−1.48.

A radius of curvature of an objective surface of the seventh lens L7 is R13, and a radius of curvature of an image surface of the seventh lens L7 is R14. The following relationship expression is satisfied: 0.91≤(R13+R14)/(R13−R14)≤5.68, in which the shape of the sixth lens L6 is specified. Within the range, it is conducive to compensating for the aberration of the off-axis drawing angle and other problems with the development of ultra-thinness and wide-angle. In an embodiment, 1.46≤(R13+R14)/(R13−R14)≤4.54.

In this embodiment, the objective surface of the seventh lens L7 is convex at a proximal-axis position, the image surface is concave at a proximal-axis position, and the seventh lens L7 has a negative refractive force.

An on-axis thickness of the seventh lens L7 is d13, and the total track length of the camera optical lens has TTL. The following relationship expression is satisfied: 0.01≤d13/TTL≤0.06, which is conducive to realizing ultra-thinness. In an embodiment, 0.02≤d13/TTL≤0.05.

The camera optical lens 10 of the present application will be described below with examples. The symbols recorded in each example are shown below. The units of the focal length, the on-axis distance, the radius of curvature, the on-axis thickness, the position of the inflection point, and the position of the stationary point are in mm.

TTL: total track length (on-axis distance from the objective surface to the image surface of the first lens L1) in mm;

In an embodiment, the objective surface and/or image surface of the lens may also be provided with a reverse curvature point and/or a stationary point to meet high-quality imaging requirements, as described below for specific implementable embodiments.

Tables 1 and 2 show the design data of the camera optical lens 10 according to the first embodiment of the present application.

TABLE 1

| | R | | d | | nd | | vd |
|---|---|---|---|---|---|---|---|
| S1 | ∞ | d0= | −14.700 | | | | |
| R1 | 38.699 | d1= | 1.386 | nd1 | 1.6385 | v1 | 55.47 |
| R2 | 6.239 | d2= | 4.507 | | | | |
| R3 | −40.000 | d3= | 4.768 | nd2 | 1.6610 | v2 | 20.53 |
| R4 | 8.127 | d4= | 0.200 | | | | |
| R5 | 4.013 | d5= | 3.450 | nd3 | 1.6153 | v3 | 25.94 |
| R6 | −420.689 | d6= | 0.449 | | | | |
| R7 | 7.195 | d7= | 1.728 | nd4 | 1.6192 | v4 | 63.85 |
| R8 | −4.543 | d8= | 0.115 | | | | |
| R9 | 14.177 | d9= | 0.620 | nd5 | 1.6610 | v5 | 20.53 |
| R10 | 3.636 | d10= | 0.747 | | | | |
| R11 | 181.856 | d11= | 1.056 | nd6 | 1.5346 | v6 | 55.69 |
| R12 | −9.665 | d12= | 1.599 | | | | |
| R13 | 4.691 | d13= | 0.884 | nd7 | 1.6153 | v7 | 25.94 |
| R14 | 2.731 | d14= | 0.407 | | | | |
| R15 | ∞ | d15= | 0.300 | ndg | 1.5233 | vg | 54.52 |
| R16 | ∞ | d16= | 0.959 | | | | |

The meaning of each symbol is as follows.

S1: aperture;

R: radius of curvature of the optical surface, and center radius of curvature in the case of a lens;

R1: radius of curvature of the objective surface of the first lens L1;

R2: radius of curvature of the image surface of the first lens L1;

R3: radius of curvature of the objective surface of the second lens L2;

R4: radius of curvature of the image surface of the second lens L2;

R5: radius of curvature of the objective surface of the third lens L3;

R6: radius of curvature of the image surface of the third lens L3;

R7: radius of curvature of the objective surface of the fourth lens L4;

R8: radius of curvature of the image surface of the fourth lens L4;

R9: radius of curvature of the objective surface of the fifth lens L5;

R10: radius of curvature of the image surface of the fifth lens L5;

R11: radius of curvature of the objective surface of the sixth lens L6;

R12: radius of curvature of the image surface of the sixth lens L6;

R13: radius of curvature of the objective surface of the seventh lens L7;

R14: radius of curvature of the image surface of the seventh lens L7;

R15: radius of curvature of the objective surface of the optical filter GF;

R16: radius of curvature of the image surface of the optical filter GF;

d: on-axis thickness of the lens and the on-axis distance between the lens;

d0: on-axis distance from the aperture S1 to the objective surface of the first lens L1;

d1: on-axis thickness of the first lens L1;

d2: on-axis distance from the image surface of the first lens L1 to the objective surface of the second lens L2;

d3: on-axis thickness of the second lens L2;

d4: on-axis distance from the image surface of the second lens L2 to the objective surface of the third lens L3;

d5: on-axis thickness of the third lens L3;

d6: on-axis distance from the image surface of the third lens L3 to the objective surface of the fourth lens L4;

d7: on-axis thickness of the fourth lens L4;

d8: on-axis distance from the image surface of the fourth lens L4 to the objective surface of the fifth lens L5;

d9: on-axis thickness of the fifth lens L5;

d10: on-axis distance from the image surface of the fifth lens L5 to the objective surface of the sixth lens L6;

d11: on-axis thickness of the sixth lens L6;

d12: on-axis distance from the image surface of the sixth lens L6 to the objective surface of the seventh lens L7;

d13: on-axis thickness of the seventh lens L7;

d14: on-axis distance from the image surface of the seventh lens L7 to the objective surface of the optical filter GF;

d15: on-axis thickness of the optical filter GF;

d16: on-axis distance from the image surface of the optical filter GF to the image surface;

nd: refractive index of the line d (the line d is green light with a wavelength of 550 nm);

nd1: refractive index of the line d of the first lens L1;

nd2: refractive index of the line d of the second lens L2;

nd3: refractive index of the line d of the third lens L3;

nd4: refractive index of the line d of the fourth lens L4;

nd5: refractive index of the line d of the fifth lens L5;

nd6: refractive index of the line d of the sixth lens L6;

nd7: refractive index of line d of the seventh lens L7;
ndg: refractive index of line d of the optical filter GF;
vd: Abbe number;
v1: Abbe number of the first lens L1;
v2: Abbe number of the second lens L2;
v3: Abbe number of the third lens L3;
v4: Abbe number of the fourth lens LA;
v5: Abbe number of the fifth lens L5;
v6: Abbe number of the sixth lens L6;
v7: Abbe number of the seventh lens L7;
vg: Abbe number of the optical filter GF.

Table 2 illustrates the aspheric data of each lens in the camera optical lens 10 according to the first embodiment of the present application.

TABLE 2

| | Cone Coefficient | Aspheric Coefficient | | | | |
|---|---|---|---|---|---|---|
| | k | A4 | A6 | A8 | A10 | A12 |
| R1 | 0.000E+00 | | | | | |
| R2 | 0.000E+00 | | | | | |
| R3 | 4.491E+01 | 1.791E−03 | −7.379E−05 | 4.909E−06 | −3.296E−07 | 1.820E−08 |
| R4 | −1.898E+00 | 1.005E−02 | −1.423E−03 | 6.767E−04 | −2.182E−04 | 5.587E−05 |
| R5 | 4.571E−01 | 3.399E−03 | −1.253E−03 | 3.695E−04 | −8.297E−05 | 2.019E−05 |
| R6 | 9.500E+01 | −8.704E−03 | −9.645E−04 | 5.093E−03 | −5.165E−03 | 3.099E−03 |
| R7 | −5.588E+00 | −1.064E−02 | −1.501E−04 | 1.490E−03 | −1.322E−03 | 5.836E−04 |
| R8 | −1.419E+01 | −2.977E−02 | 1.042E−02 | −4.013E−03 | 1.037E−03 | −1.647E−04 |
| R9 | 2.430E+01 | −2.737E−02 | 8.129E−03 | −3.222E−03 | 1.073E−03 | −2.910E−04 |
| R10 | −6.191E+00 | −4.575E−03 | 1.773E−03 | −4.418E−04 | 7.254E−05 | −9.332E−06 |
| R11 | −9.000E+01 | −7.911E−03 | 3.395E−03 | −1.163E−03 | 3.424E−04 | −6.861E−05 |
| R12 | −5.607E+00 | −1.307E−02 | 3.417E−03 | −7.412E−04 | 1.341E−04 | −1.629E−05 |
| R13 | −1.312E+01 | −2.140E−02 | 4.411E−04 | 3.349E−04 | −6.303E−05 | 6.130E−06 |
| R14 | −4.099E+00 | −1.760E−02 | 2.273E−03 | −2.166E−04 | 1.467E−05 | −7.017E−07 |

| | Cone Coefficient | Aspheric Coefficient | | | |
|---|---|---|---|---|---|
| | k | A14 | A16 | A18 | A20 |
| R1 | 0.000E+00 | | | | |
| R2 | 0.000E+00 | | | | |
| R3 | 4.491E+01 | −7.311E−10 | 1.845E−11 | −2.516E−13 | 1.332E−15 |
| R4 | −1.898E+00 | −9.208E−06 | 8.752E−07 | −4.383E−08 | 8.961E−10 |
| R5 | 4.571E−01 | −3.838E−06 | 4.123E−07 | −2.141E−08 | 4.167E−10 |
| R6 | 9.500E+01 | −1.130E−03 | 2.437E−04 | −2.816E−05 | 1.332E−06 |
| R7 | −5.588E+00 | −1.298E−04 | 1.087E−05 | 0.000E+00 | 0.000E+00 |
| R8 | −1.419E+01 | 1.339E−05 | −5.101E−07 | 0.000E+00 | 0.000E+00 |
| R9 | 2.430E+01 | 5.849E−05 | −8.188E−06 | 6.958E−07 | −2.794E−08 |
| R10 | −6.191E+00 | 9.127E−07 | −6.543E−08 | 3.285E−09 | −9.075E−11 |
| R11 | −9.000E+01 | 8.962E−06 | −7.323E−07 | 3.370E−08 | −6.595E−10 |
| R12 | −5.607E+00 | 1.405E−06 | −8.354E−08 | 2.805E−09 | −3.481E−11 |
| R13 | −1.312E+01 | −3.562E−07 | 1.229E−08 | −2.319E−10 | 1.836E−12 |
| R14 | −4.099E+00 | 2.270E−08 | −4.656E−10 | 5.475E−12 | −2.911E−14 |

For convenience, the aspheric surfaces of the individual lens surfaces use the aspheric surfaces shown in Equation (1) below. However, the present application is not limited to the polynomial form of the aspheric surfaces expressed in Equation (1).

$$z = (cr^2)/\{1 + [1 - (k+1)(c^2r^2)]^{1/2}\} + A4r^4 + A6r^6 + A8r^8 + A10r^{10} + A12r^{12} + A14r^{14} + A16r^{16} + A18r^{18} + A20r^{20} \quad (1)$$

k is the cone coefficient; A4, A6, A8, A10, A12, A14, A16, A18, A20 is the aspheric coefficient; c is the curvature at the center of the optical surface; r is the perpendicular distance between the point on the aspheric curve and the optical axis; and z is the aspheric depth (the perpendicular distance between the point on the aspheric surface at a distance of r from the optical axis and the cut surface tangent to the apex of the aspheric surface on the optical axis).

Tables 3 and 4 show the design data of the inflection point and the stationary point of each lens in the camera optical lens 10 according to the first embodiment of the present application. P1R1, P1R2 represent the objective surface and the image surface of the first lens L1, respectively; P2R1, P2R2 represent the objective surface and the image surface of the second lens L2, respectively; P3R1, P3R2 represent the objective surface and the image surface of the third lens L3, respectively; P4R1, P4R2 represent the objective surface and the image surface of the fourth lens L4, respectively; P5R1, P5R2 represent the objective surface and the image surface of the fifth lens L5, respectively; P6R1, P6R2 represent the objective surface and the image surface of the sixth lens L6, respectively; and P7R1, P7R2 represent the objective surface and the image surface of the seventh lens L7, respectively. The data corresponding to the "position of the inflection point" field is the perpendicular distance from the inflection point set on the surface of each lens to the optical axis of the camera optical lens 10. The data corresponding to the "Position of the stationary point" field is the perpendicular distance from the stationary point set on the surface of each lens to the optical axis of the camera optical lens 10.

TABLE 3

| | Number of Inflection Points | Position of Inflection Point 1 | Position of Inflection Point 2 | Position of Inflection Point 3 |
|---|---|---|---|---|
| P1R1 | 0 | / | / | / |
| P1R2 | 0 | / | / | / |
| P2R1 | 2 | 1.195 | 4.675 | / |
| P2R2 | 0 | / | / | / |

TABLE 3-continued

| | Number of Inflection Points | Position of Inflection Point 1 | Position of Inflection Point 2 | Position of Inflection Point 3 |
|---|---|---|---|---|
| P3R1 | 0 | / | / | / |
| P3R2 | 1 | 1.465 | / | / |
| P4R1 | 1 | 1.055 | / | / |
| P4R2 | 0 | / | / | / |
| P5R1 | 1 | 0.525 | / | / |
| P5R2 | 1 | 2.025 | / | / |
| P6R1 | 2 | 0.255 | 1.505 | / |
| P6R2 | 1 | 2.125 | / | / |
| P7R1 | 3 | 0.765 | 3.175 | 4.515 |
| P7R2 | 1 | 1.165 | / | / |

TABLE 4

| | Number of Stationary Points | Position of Stationary Point 1 | Position of Stationary Point 2 |
|---|---|---|---|
| P1R1 | 0 | / | / |
| P2R2 | 0 | / | / |
| P2R1 | 1 | 2.175 | / |
| P2R2 | 0 | / | / |
| P3R1 | 0 | / | / |
| P3R2 | 0 | / | / |
| P4R1 | 0 | / | / |
| P4R2 | 0 | / | / |
| P5R1 | 1 | 0.975 | / |
| P5R2 | 0 | / | / |
| P6R1 | 2 | 0.445 | 1.985 |
| P6R2 | 1 | 3.005 | / |
| P7R1 | 1 | 1.415 | / |
| P7R2 | 1 | 2.745 | / |

Figure 2:
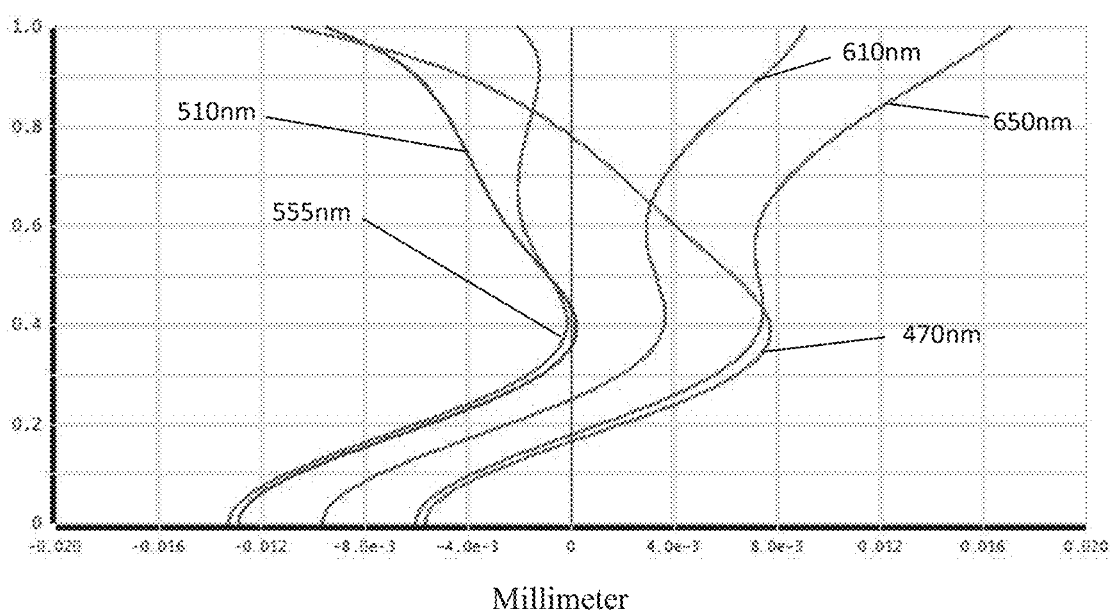
FIG. 2 is a schematic diagram showing the axial aberration of the camera optical lens shown in FIG. 1.
Figure 3:
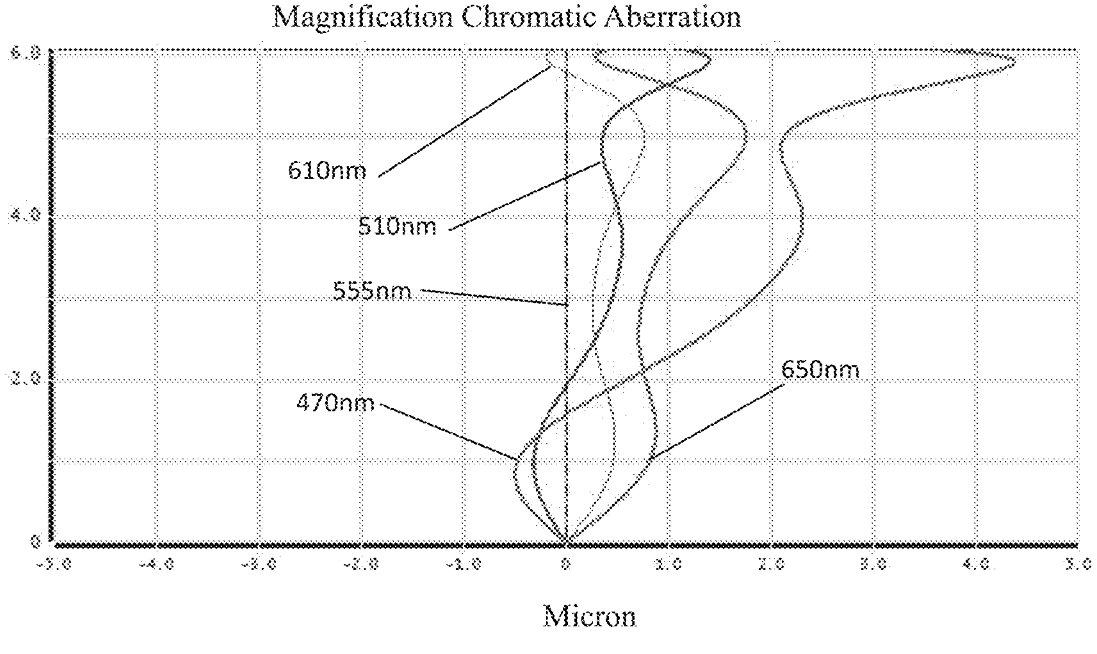
FIG. 3 is a schematic diagram showing the magnification chromatic aberration of the camera optical lens shown in FIG. 1.
Figure 4:
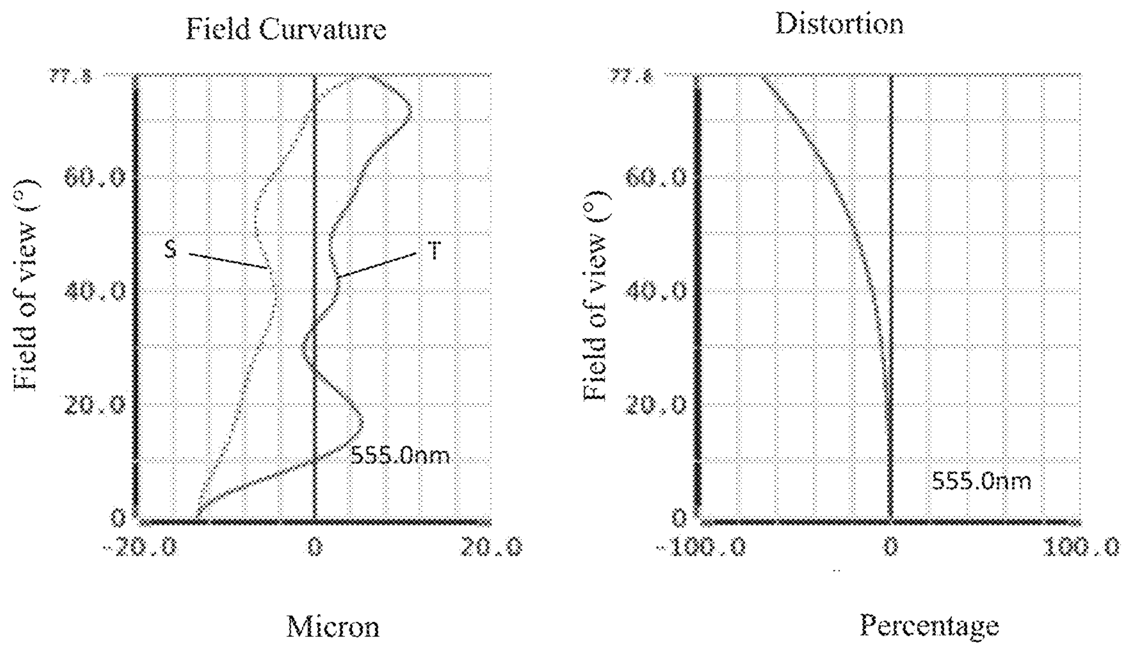
FIG. 4 is a schematic diagram showing the field curvature and distortion of the camera optical lens shown in FIG. 1.
Figure 5:
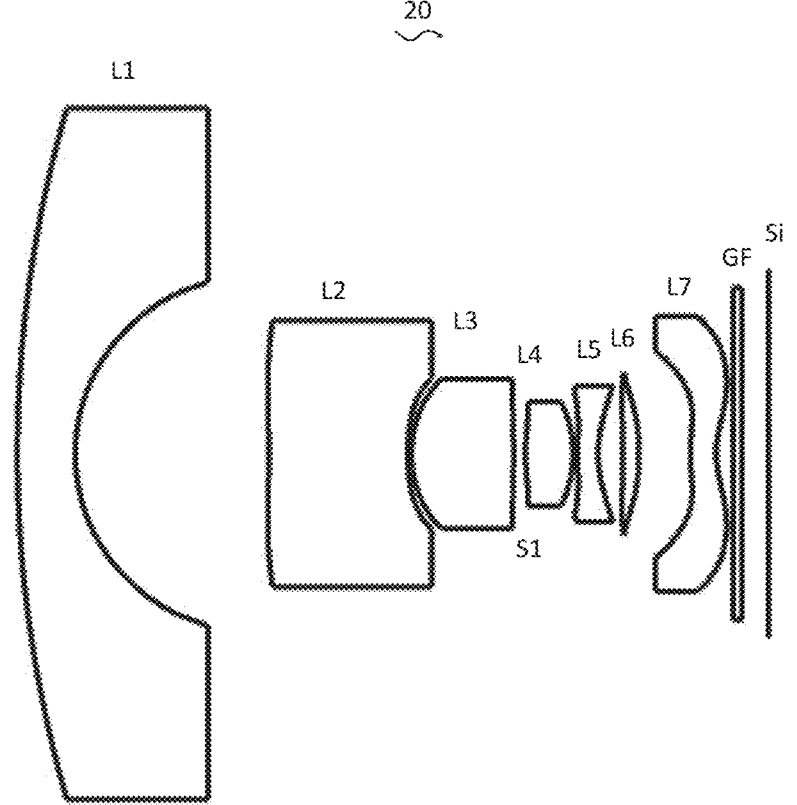
FIG. 5 is a structural schematic diagram of the camera optical lens according to the second embodiment of the present application.

FIGS. 2 and 3 are schematic diagrams showing the axial aberration and the magnification chromatic aberration of light with wavelengths of 470 nm, 510 nm, 555 nm, 610 nm, and 650 nm, respectively, after passing through the camera optical lens 10 according to the first embodiment. FIG. 4 is a schematic diagram showing the field curvature and distortion of light with a wavelength of 555.0 nm after passing through the camera optical lens 10 according to the first embodiment. The field curvature S of FIG. 4 is a field curvature in the arc-sagittal direction, and T is a field curvature in the meridional direction.

Table 25 in the following shows various values and the values corresponding to the parameters specified in the relationship expressions in each of the first embodiment, second embodiment, third embodiment, fourth embodiment, and fifth embodiment, and the comparison example.

As shown in Table 25, the first embodiment satisfies each of the relationship expressions.

In this embodiment, the camera optical lens 10 has an Entrance Pupil Diameter (ENPD) of 1.538 mm, a full field-of-view image height (IH) of 6.060 mm, a field of view (FOV) of 155.65° in the diagonal direction, and an aperture value FNO of 2.60. The camera optical lens 10 satisfies the design requirements of large aperture and ultra-wide angle and has excellent optical characteristics.

Second Embodiment

The second embodiment is basically the same as the first embodiment, the symbols have the same meaning as that according to the first embodiment, and only the differences are listed below.

Tables 5 and 6 show the design data of the camera optical lens 20 according to the second embodiment of the present application.

TABLE 5

| | R | | d | | nd | | νd |
|---|---|---|---|---|---|---|---|
| S1 | ∞ | d0= | −16.945 | | | | |
| R1 | 42.104 | d1= | 1.920 | nd1 | 1.6385 | ν1 | 55.47 |
| R2 | 6.011 | d2= | 6.426 | | | | |
| R3 | −39.304 | d3= | 4.613 | nd2 | 1.6610 | ν2 | 20.53 |
| R4 | 8.214 | d4= | 0.124 | | | | |
| R5 | 4.028 | d5= | 3.386 | nd3 | 1.6153 | ν3 | 25.94 |
| R6 | −243.417 | d6= | 0.399 | | | | |
| R7 | 7.203 | d7= | 1.576 | nd4 | 1.6192 | ν4 | 63.85 |
| R8 | −4.593 | d8= | 0.156 | | | | |
| R9 | 14.110 | d9= | 0.672 | nd5 | 1.6610 | ν5 | 20.53 |
| R10 | 3.640 | d10= | 0.812 | | | | |
| R11 | 257.322 | d11= | 0.550 | nd6 | 1.5346 | ν6 | 55.69 |
| R12 | −9.078 | d12= | 1.707 | | | | |
| R13 | 5.564 | d13= | 0.856 | nd7 | 1.6153 | ν7 | 25.94 |
| R14 | 2.938 | d14= | 0.552 | | | | |
| R15 | ∞ | d15= | 0.300 | ndg | 1.5233 | νg | 54.52 |
| R16 | ∞ | d16= | 0.876 | | | | |

Table 6 illustrates the aspheric data for each lens in the camera optical lens 20 according to the second embodiment of the present application.

TABLE 6

| | Cone Coefficient | Aspheric Coefficient | | | | |
|---|---|---|---|---|---|---|
| | k | A4 | A6 | A8 | A10 | A12 |
| R1 | | | | | | |
| R2 | | | | | | |
| R3 | 4.474E+01 | 1.751E−03 | −7.321E−05 | 4.913E−06 | −3.299E−07 | 1.821E−08 |
| R4 | −2.181E+00 | 1.002E−02 | −1.427E−03 | 6.752E−04 | −2.185E−04 | 5.585E−05 |
| R5 | 4.346E−01 | 3.341E−03 | −1.262E−03 | 3.694E−04 | −8.285E−05 | 2.018E−05 |
| R6 | −6.287E−01 | −8.392E−03 | −8.615E−04 | 5.109E−03 | −5.165E−03 | 3.097E−03 |
| R7 | −4.965E+00 | −1.044E−02 | −1.170E−05 | 1.522E−03 | −1.319E−03 | 5.793E−04 |
| R8 | −1.463E+01 | −2.994E−02 | 1.034E−02 | −4.020E−03 | 1.035E−03 | −1.650E−04 |
| R9 | 2.197E+01 | −2.748E−02 | 8.126E−03 | −3.237E−03 | 1.070E−03 | −2.914E−04 |
| R10 | −5.852E+00 | −4.468E−03 | 1.780E−03 | −4.426E−04 | 7.229E−05 | −9.362E−06 |
| R11 | −9.500E+01 | −7.862E−03 | 3.399E−03 | −1.163E−03 | 3.425E−04 | −6.859E−05 |
| R12 | −4.789E+00 | −1.319E−02 | 3.420E−03 | −7.383E−04 | 1.343E−04 | −1.628E−05 |
| R13 | −2.032E+01 | −2.294E−02 | 4.019E−04 | 3.328E−04 | −6.311E−05 | 6.127E−06 |
| R14 | −4.856E+00 | −1.793E−02 | 2.249E−03 | −2.158E−04 | 1.467E−05 | −7.021E−07 |

TABLE 6-continued

| | Cone Coefficient | Aspheric Coefficient | | | |
|---|---|---|---|---|---|
| | k | A14 | A16 | A18 | A20 |
| R1 | | | | | |
| R2 | | | | | |
| R3 | 4.474E+01 | −7.301E−10 | 1.850E−11 | −2.509E−13 | 1.222E−15 |
| R4 | −2.181E+00 | −9.209E−06 | 8.750E−07 | −4.390E−08 | 8.765E−10 |
| R5 | 4.346E−01 | −3.843E−06 | 4.113E−07 | −2.153E−08 | 4.083E−10 |
| R6 | −6.287E−01 | −1.131E−03 | 2.436E−04 | −2.814E−05 | 1.351E−06 |
| R7 | −4.965E+00 | −1.336E−04 | 8.836E−06 | −1.337E−07 | 8.210E−07 |
| R8 | −1.463E+01 | 1.335E−05 | −5.108E−07 | −3.220E−09 | −3.310E−09 |
| R9 | 2.197E+01 | 5.845E−05 | −8.186E−06 | 6.965E−07 | −2.787E−08 |
| R10 | −5.852E+00 | 9.114E−07 | −6.517E−08 | 3.381E−09 | −8.402E−11 |
| R11 | −9.500E+01 | 8.964E−06 | −7.322E−07 | 3.370E−08 | −6.601E−10 |
| R12 | −4.789E+00 | 1.405E−06 | −8.350E−08 | 2.810E−09 | −3.392E−11 |
| R13 | −2.032E+01 | −3.563E−07 | 1.229E−08 | −2.324E−10 | 1.782E−12 |
| R14 | −4.856E+00 | 2.269E−08 | −4.659E−10 | 5.471E−12 | −2.893E−14 |

Tables 7 and 8 show the design data of the inflection point and the stationary point of each lens in the camera optical lens 20 according to the second embodiment of the present application.

TABLE 7

| | Number of Inflection Points | Position of Inflection Point 1 | Position of Inflection Point 2 |
|---|---|---|---|
| P1R1 | 0 | / | / |
| P1R2 | 0 | / | / |
| P2R1 | 1 | 1.225 | / |
| P2R2 | 0 | / | / |
| P3R1 | 0 | / | / |
| P3R2 | 1 | 1.425 | / |
| P4R1 | 1 | 1.095 | / |
| P4R2 | 0 | / | / |
| P5R1 | 1 | 0.525 | / |
| P5R2 | 1 | 2.035 | / |
| P6R1 | 2 | 0.215 | 1.505 |
| P6R2 | 1 | 2.105 | / |
| P7R1 | 1 | 0.685 | / |
| P7R2 | 1 | 1.095 | / |

TABLE 8

| | Number of Stationary Points | Position of Stationary Point 1 | Position of Stationary Point 2 |
|---|---|---|---|
| P1R1 | 0 | / | / |
| P1R2 | 0 | / | / |
| P2R1 | 1 | 2.245 | / |
| P2R2 | 0 | / | / |
| P3R1 | 0 | / | / |
| P3R2 | 0 | / | / |
| P4R1 | 0 | / | / |
| P4R2 | 0 | / | / |
| P5R1 | 1 | 0.965 | / |
| P5R2 | 0 | / | / |
| P6R1 | 2 | 0.365 | 1.975 |
| P6R2 | 0 | / | / |
| P7R1 | 1 | 1.235 | / |
| P7R2 | 1 | 2.425 | / |

Figure 6:
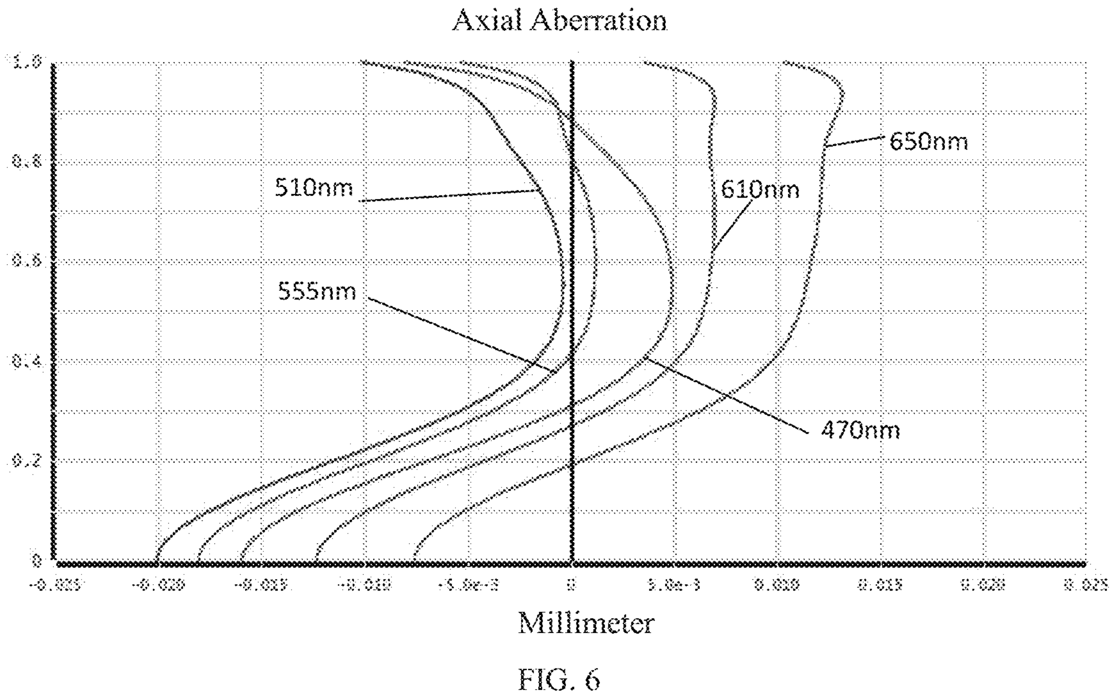
FIG. 6 is a schematic diagram showing the axial aberration of the camera optical lens shown in FIG. 5.
Figure 7:
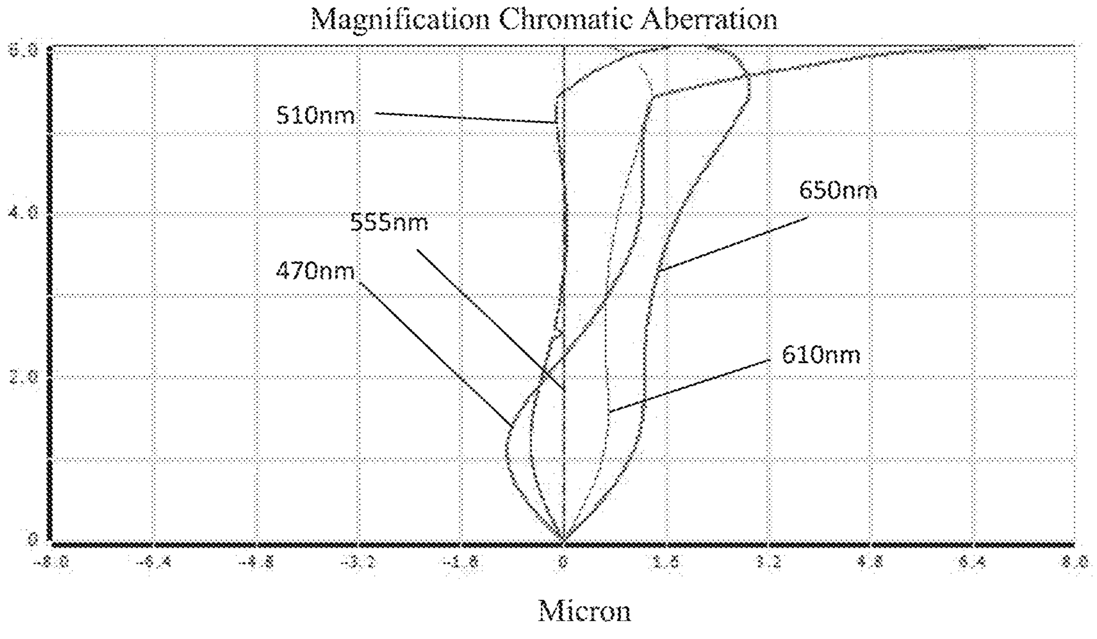
FIG. 7 is a schematic diagram showing the magnification chromatic aberration of the camera optical lens shown in FIG. 5.
Figure 8:
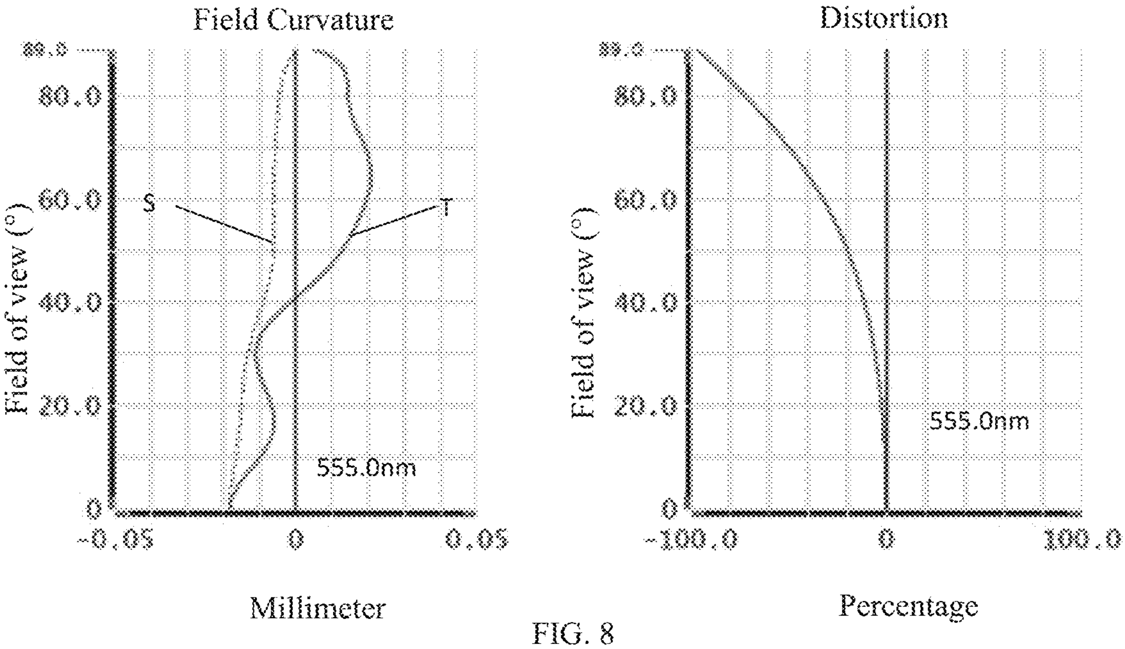
FIG. 8 is a schematic diagram showing the field curvature and distortion of the camera optical lens shown in FIG. 5.
Figure 9:
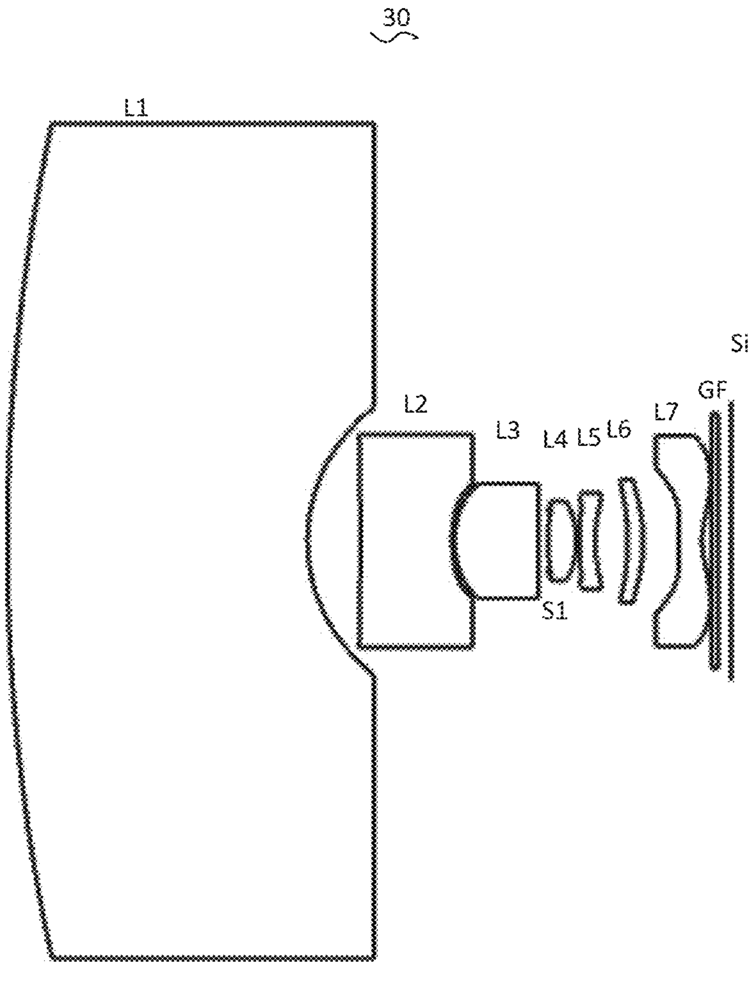
FIG. 9 is a structural schematic diagram of the camera optical lens according to the third embodiment of the present application.

FIGS. 6 and 7 are schematic diagrams showing the axial aberration and magnification chromatic aberration of light with wavelengths of 470 nm, 510 nm, 555 nm, 610 nm, and 650 nm, respectively, after passing through the camera optical lens 20 according to the second embodiment. FIG. 8 is a schematic diagram showing the field curvature and distortion of light with a wavelength of 555.0 nm after passing through the camera optical lens 20 according to the second embodiment. The field curvature S of FIG. 8 is the field curvature in the arc-sagittal direction, and T is the field curvature in the meridional direction.

As shown in Table 25, the second embodiment satisfies each of the relationship expressions.

In this embodiment, the camera optical lens 20 has an Entrance Pupil Diameter (ENPD) of 1.360 mm, a full field-of-view image height (IH) of 6.060 mm, a field of view (FOV) of 178.00° in the diagonal direction, and an aperture value FNO of 2.60. The camera optical lens 20 satisfies the design requirements of large aperture and ultra-wide angle and has excellent optical characteristics.

Third Embodiment

The third embodiment is basically the same as the first embodiment, the meaning of the symbols is the same as that according to the first embodiment, and only the differences are listed below. The image surface of the third lens L3 is concave at a proximal-axis position, and the objective surface of the sixth lens L6 is concave at a proximal-axis position.

Tables 9 and 10 show the design data of the camera optical lens 30 according to the third embodiment of the present application.

TABLE 9

| | R | | d | | nd | | vd |
|---|---|---|---|---|---|---|---|
| S1 | ∞ | d0= | −27.517 | | | | |
| R1 | 89.610 | d1= | 17.387 | nd1 | 1.6385 | v1 | 55.47 |
| R2 | 7.505 | d2= | 2.203 | | | | |
| R3 | −35.436 | d3= | 3.758 | nd2 | 1.6610 | v2 | 20.53 |
| R4 | 7.333 | d4= | 0.099 | | | | |
| R5 | 4.063 | d5= | 3.475 | nd3 | 1.6153 | v3 | 25.94 |
| R6 | 60.722 | d6= | 0.375 | | | | |
| R7 | 6.478 | d7= | 1.166 | nd4 | 1.6192 | v4 | 63.85 |
| R8 | −4.704 | d8= | 0.145 | | | | |
| R9 | 10.090 | d9= | 0.636 | nd5 | 1.6610 | v5 | 20.53 |
| R10 | 5.253 | d10= | 1.331 | | | | |
| R11 | −20.506 | d11= | 0.647 | nd6 | 1.5346 | v6 | 55.69 |
| R12 | −10.333 | d12= | 1.469 | | | | |
| R13 | 12.143 | d13= | 0.970 | nd7 | 1.6153 | v7 | 25.94 |
| R14 | 3.542 | d14= | 0.384 | | | | |
| R15 | ∞ | d15= | 0.300 | ndg | 1.5233 | vg | 54.52 |
| R16 | ∞ | d16= | 0.542 | | | | |

Table 10 illustrates the aspheric data for each lens in the camera optical lens 30 according to the third embodiment of the present application.

TABLE 10

| | Cone Coefficient | Aspheric Coefficient | | | | |
|---|---|---|---|---|---|---|
| | k | A4 | A6 | A8 | A10 | A12 |
| R1 | | | | | | |
| R2 | | | | | | |
| R3 | 4.213E+01 | 1.615E−03 | −8.158E−05 | 4.685E−06 | −3.328E−07 | 1.825E−08 |
| R4 | −1.352E+00 | 1.017E−02 | −1.328E−03 | 6.904E−04 | −2.176E−04 | 5.595E−05 |
| R5 | 4.071E−01 | 2.823E−03 | −1.211E−03 | 3.759E−04 | −8.315E−05 | 2.021E−05 |
| R6 | 9.524E+01 | −7.415E−03 | −1.027E−03 | 5.129E−03 | −5.149E−03 | 3.102E−03 |
| R7 | −3.722E+00 | −1.023E−02 | −4.522E−04 | 1.337E−03 | −1.364E−03 | 5.861E−04 |
| R8 | −1.326E+01 | −3.155E−02 | 1.005E−02 | −3.994E−03 | 1.039E−03 | −1.711E−04 |
| R9 | 2.597E+01 | −2.588E−02 | 8.011E−03 | −3.348E−03 | 1.051E−03 | −2.938E−04 |
| R10 | −7.742E+00 | −5.362E−03 | 1.643E−03 | −4.479E−04 | 7.148E−05 | −9.624E−06 |
| R11 | 4.758E+01 | −9.529E−03 | 3.382E−03 | −1.179E−03 | 3.433E−04 | −6.827E−05 |
| R12 | −1.339E+01 | −1.287E−02 | 3.421E−03 | −7.357E−04 | 1.343E−04 | −1.630E−05 |
| R13 | −9.638E+01 | −2.323E−02 | 4.770E−04 | 3.381E−04 | −6.289E−05 | 6.135E−06 |
| R14 | −4.169E+00 | −1.688E−02 | 2.206E−03 | −2.137E−04 | 1.462E−05 | −7.030E−07 |

| | Cone Coefficient | Aspheric Coefficient | | | |
|---|---|---|---|---|---|
| | k | A14 | A16 | A18 | A20 |
| R1 | | | | | |
| R2 | | | | | |
| R3 | 4.213E+01 | −7.258E−10 | 1.859E−11 | −2.500E−13 | 1.430E−15 |
| R4 | −1.352E+00 | −9.207E−06 | 8.753E−07 | −4.398E−08 | 9.149E−10 |
| R5 | 4.071E−01 | −3.829E−06 | 4.151E−07 | −2.145E−08 | 3.123E−10 |
| R6 | 9.524E+01 | −1.130E−03 | 2.435E−04 | −2.825E−05 | 1.380E−06 |
| R7 | −3.722E+00 | −1.234E−04 | 1.380E−05 | 2.674E−07 | −6.818E−07 |
| R8 | −1.326E+01 | 9.833E−06 | −1.491E−06 | 3.084E−08 | 1.787E−07 |
| R9 | 2.597E+01 | 5.813E−05 | −8.086E−06 | 6.722E−07 | −6.463E−08 |
| R10 | −7.742E+00 | 8.518E−07 | −7.409E−08 | 2.763E−09 | 1.908E−11 |
| R11 | 4.758E+01 | 8.992E−06 | −7.318E−07 | 3.347E−08 | −6.960E−10 |
| R12 | −1.339E+01 | 1.405E−06 | −8.343E−08 | 2.812E−09 | −3.585E−11 |
| R13 | −9.638E+01 | −3.562E−07 | 1.228E−08 | −2.327E−10 | 1.820E−12 |
| R14 | −4.169E+00 | 2.269E−08 | −4.655E−10 | 5.494E−12 | −2.843E−14 |

Tables 11 and 12 show the design data of the inflection point and the stationary point of each lens in the camera optical lens 30 according to the third embodiment of the present application.

TABLE 11

| | Number of Inflection Points | Position of Inflection Point 1 | Position of Inflection Point 2 |
|---|---|---|---|
| P1R1 | 0 | / | / |
| P1R2 | 0 | / | / |
| P2R1 | 2 | 1.445 | 3.265 |
| P2R2 | 0 | / | / |
| P3R1 | 0 | / | / |
| P3R2 | 2 | 0.445 | 1.215 |
| P4R1 | 1 | 1.045 | / |
| P4R2 | 0 | / | / |
| P5R1 | 1 | 0.765 | / |
| P5R2 | 1 | 1.595 | / |
| P6R1 | 1 | 2.205 | / |
| P6R2 | 1 | 2.015 | / |
| P7R1 | 2 | 0.495 | 3.015 |
| P7R2 | 1 | 1.175 | / |

TABLE 12

| | Number of Stationary Points | Position of Stationary Point 1 | Position of Stationary Point 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 2 | 0.805 | 1.435 |
| P4R1 | 0 | / | / |
| P4R2 | 0 | / | / |
| P5R1 | 1 | 1.515 | / |
| P5R2 | 0 | / | / |
| P6R1 | 0 | / | / |
| P6R2 | 1 | 2.755 | / |
| P7R1 | 1 | 0.865 | / |
| P7R2 | 1 | 2.645 | / |

Figure 10:
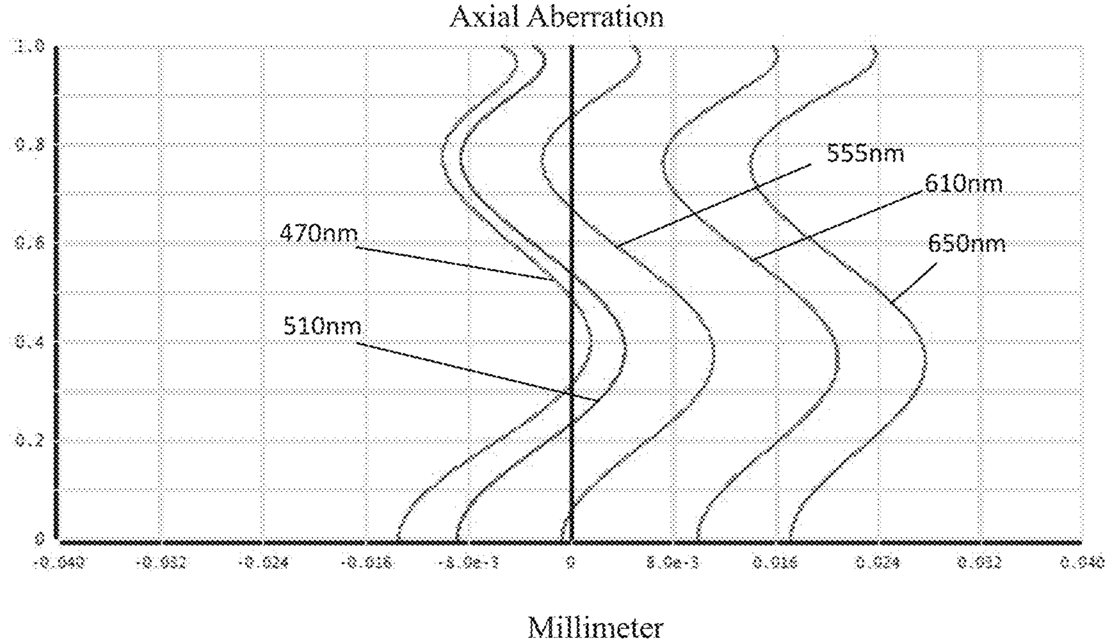
FIG. 10 is a schematic diagram showing the axial aberration of the camera optical lens shown in FIG. 9.
Figure 11:
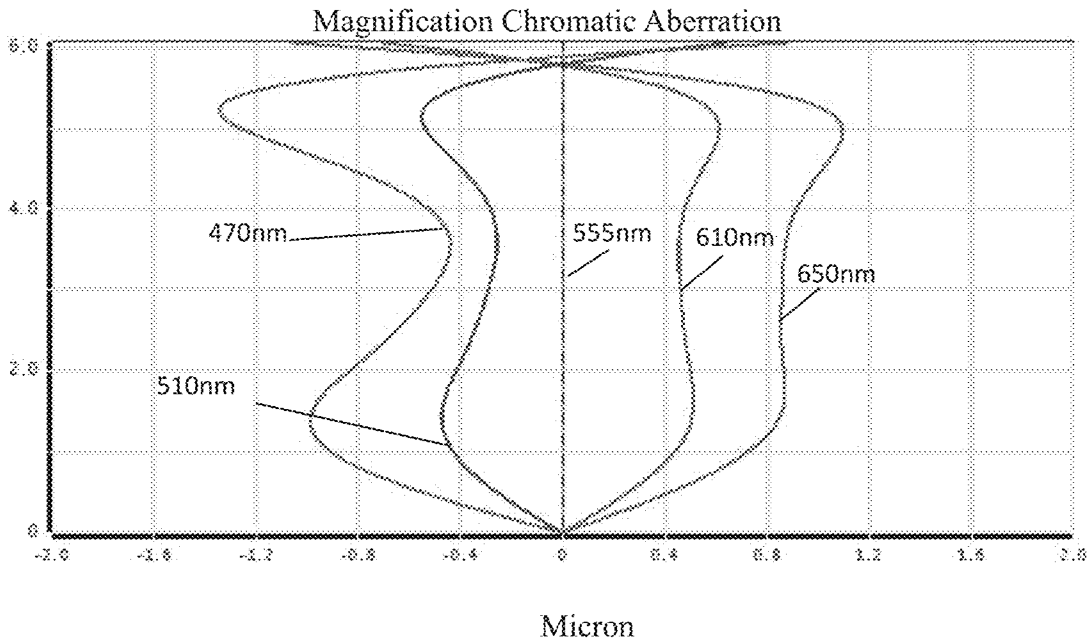
FIG. 11 is a schematic diagram showing the magnification chromatic aberration of the camera optical lens shown in FIG. 9.
Figure 12:
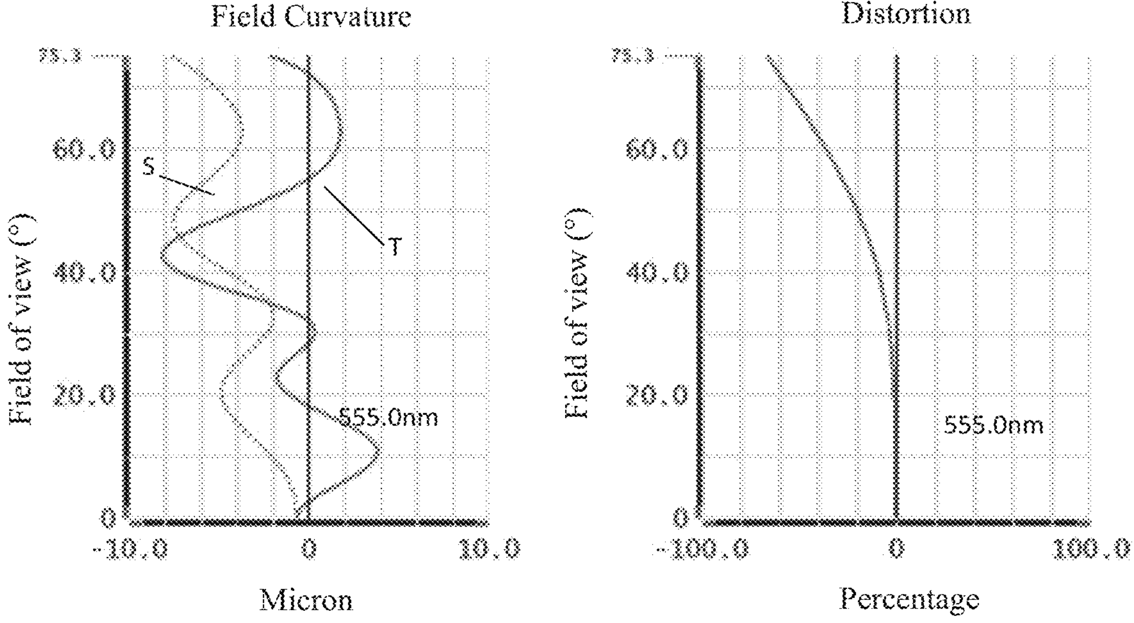
FIG. 12 is a schematic diagram showing the field curvature and distortion of the camera optical lens shown in FIG. 9.
Figure 13:
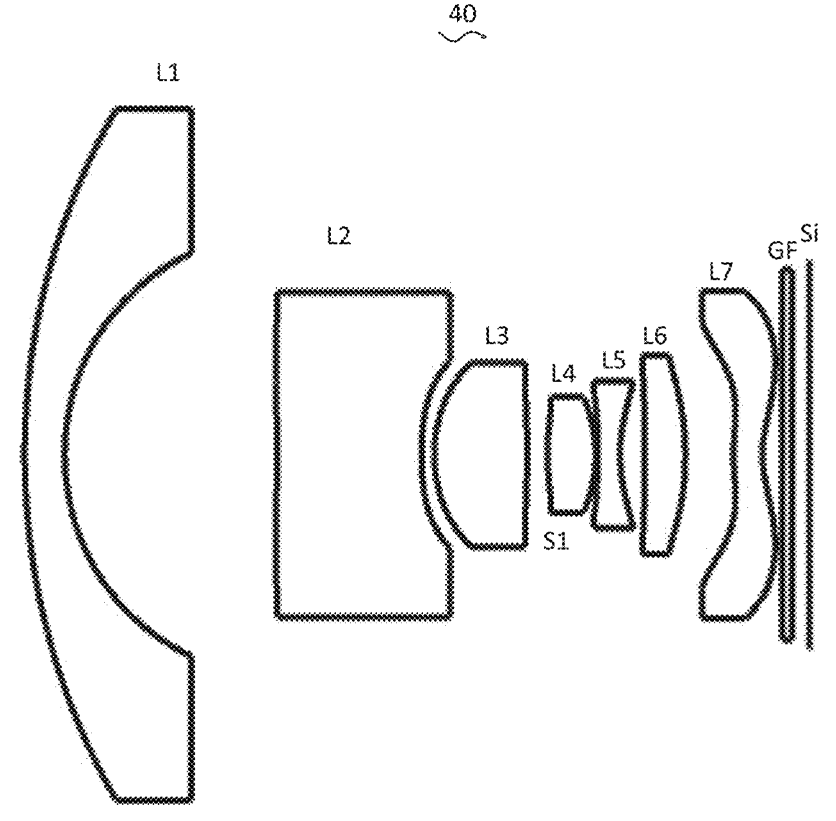
FIG. 13 is a structural schematic diagram of the camera optical lens according to the fourth embodiment of the present application.

FIGS. 10 and 11 are schematic diagrams showing the axial aberration and magnification chromatic aberration after light with wavelengths of 470 nm, 510 nm, 555 nm, 610 nm, and 650 nm, respectively, after passing through the camera optical lens 30 according to the third embodiment. FIG. 12 is a schematic diagram showing the field curvature and distortion of light with a wavelength of 555.0 nm after passing through the camera optical lens 30 according to the third embodiment. The field curvature S of FIG. 12 is the field curvature in the arc-sagittal direction, and T is the field curvature in the meridional direction.

As shown in Table 25, the third embodiment satisfies each of the relationship expressions.

In this embodiment, the camera optical lens 30 has an Entrance Pupil Diameter (ENPD) of 1.831 mm, a full field-of-view image height (IH) of 6.060 mm, a field of view (FOV) of 150.55° in the diagonal direction, and an aperture value FNO of 2.60. The camera optical lens 30 satisfies the design requirements of large aperture and ultra-wide angle and has excellent optical characteristics.

Fourth Embodiment

The fourth embodiment is basically the same as the first embodiment, the symbols have the same meaning as that according to the first embodiment, and only the differences are listed below. The objective surface of the sixth lens L6 is concave at a proximal-axis position.

Tables 13 and 14 show the design data of the camera optical lens 40 according to the fourth embodiment of the present application.

TABLE 13

| | R | | d | | nd | | vd |
|---|---|---|---|---|---|---|---|
| S1 | ∞ | d0= | −16.053 | | | | |
| R1 | 19.054 | d1= | 1.222 | nd1 | 1.6385 | v1 | 55.47 |
| R2 | 6.268 | d2= | 6.478 | | | | |
| R3 | −36.621 | d3= | 4.399 | nd2 | 1.6610 | v2 | 20.53 |
| R4 | 8.317 | d4= | 0.392 | | | | |
| R5 | 3.999 | d5= | 2.824 | nd3 | 1.6153 | v3 | 25.94 |
| R6 | −95.225 | d6= | 0.529 | | | | |
| R7 | 6.416 | d7= | 1.456 | nd4 | 1.6192 | v4 | 63.85 |
| R8 | −4.480 | d8= | 0.058 | | | | |
| R9 | 40.043 | d9= | 0.694 | nd5 | 1.6610 | v5 | 20.53 |
| R10 | 3.808 | d10= | 0.755 | | | | |
| R11 | −3004.570 | d11= | 1.229 | nd6 | 1.5346 | v6 | 55.69 |
| R12 | −10.626 | d12= | 1.479 | | | | |
| R13 | 5.678 | d13= | 0.881 | nd7 | 1.6153 | v7 | 25.94 |
| R14 | 2.908 | d14= | 0.601 | | | | |
| R15 | ∞ | d15= | 0.300 | ndg | 1.5233 | vg | 54.52 |
| R16 | ∞ | d16= | 0.523 | | | | |

Table 14 illustrates the aspheric data for each lens in the camera optical lens 40 according to the fourth embodiment of the present application.

TABLE 14

| | Cone Coefficient | Aspheric Coefficient | | | | |
|---|---|---|---|---|---|---|
| | k | A4 | A6 | A8 | A10 | A12 |
| R1 | | | | | | |
| R2 | | | | | | |
| R3 | 4.773E+01 | 1.649E−03 | −7.549E−05 | 4.888E−06 | −3.294E−07 | 1.819E−08 |
| R4 | −2.141E+00 | 9.888E−03 | −1.439E−03 | 6.679E−04 | −2.197E−04 | 5.573E−05 |
| R5 | 4.227E−01 | 3.261E−03 | −1.287E−03 | 3.672E−04 | −8.350E−05 | 2.017E−05 |
| R6 | −8.725E+03 | −8.435E−03 | −9.304E−04 | 5.099E−03 | −5.158E−03 | 3.100E−03 |
| R7 | −3.076E+00 | −1.016E−02 | −2.357E−04 | 1.400E−03 | −1.335E−03 | 5.890E−04 |
| R8 | −1.401E+01 | −3.129E−02 | 1.044E−02 | −3.856E−03 | 1.046E−03 | −1.700E−04 |
| R9 | 7.657E+01 | −2.641E−02 | 8.197E−03 | −3.218E−03 | 1.074E−03 | −2.898E−04 |
| R10 | −5.703E+00 | −4.911E−03 | 1.720E−03 | −4.460E−04 | 7.246E−05 | −9.247E−06 |
| R11 | 1.583E+06 | −7.821E−03 | 3.268E−03 | −1.175E−03 | 3.425E−04 | −6.857E−05 |
| R12 | −2.713E+01 | −1.392E−02 | 3.372E−03 | −7.398E−04 | 1.339E−04 | −1.632E−05 |
| R13 | −2.355E+01 | −2.207E−02 | 4.818E−04 | 3.358E−04 | −6.301E−05 | 6.130E−06 |
| R14 | −4.821E+00 | −1.683E−02 | 2.199E−03 | −2.145E−04 | 1.464E−05 | −7.028E−07 |

| | Cone Coefficient | Aspheric Coefficient | | | |
|---|---|---|---|---|---|
| | k | A14 | A16 | A18 | A20 |
| R1 | | | | | |
| R2 | | | | | |
| R3 | 4.773E+01 | −7.317E−10 | 1.842E−11 | −2.525E−13 | 1.511E−15 |
| R4 | −2.141E+00 | −9.219E−06 | 8.747E−07 | −4.377E−08 | 9.327E−10 |
| R5 | 4.227E−01 | −3.840E−06 | 4.129E−07 | −2.120E−08 | 4.443E−10 |
| R6 | −8.725E+03 | −1.130E−03 | 2.435E−04 | −2.819E−05 | 1.348E−06 |
| R7 | −3.076E+00 | −1.170E−04 | 1.558E−05 | 9.958E−07 | −2.298E−06 |
| R8 | −1.401E+01 | 1.092E−05 | −6.447E−07 | 6.774E−08 | 8.812E−08 |
| R9 | 7.657E+01 | 5.890E−05 | −8.113E−06 | 6.902E−07 | −3.085E−08 |
| R10 | −5.703E+00 | 9.288E−07 | −6.405E−08 | 3.350E−09 | −3.420E−10 |
| R11 | 1.583E+06 | 8.951E−06 | −7.345E−07 | 3.336E−08 | −6.739E−10 |
| R12 | −2.713E+01 | 1.402E−06 | −8.357E−08 | 2.818E−09 | −3.263E−11 |
| R13 | −2.355E+01 | −3.562E−07 | 1.229E−08 | −2.320E−10 | 1.848E−12 |
| R14 | −4.821E+00 | 2.268E−08 | −4.654E−10 | 5.502E−12 | −2.740E−14 |

Tables 15 and 16 show the design data of the inflection point and the stationary point of each lens in the camera optical lens 40 according to the fourth embodiment of the present application.

TABLE 15

| | Number of Inflection Points | Position of Inflection Point 1 | Position of Inflection Point 2 |
|---|---|---|---|
| P1R1 | 0 | / | / |
| P1R2 | 0 | / | / |
| P2R1 | 2 | 1.365 | 3.945 |
| P2R2 | 0 | / | / |
| P3R1 | 0 | / | / |
| P3R2 | 1 | 1.415 | / |
| P4R1 | 1 | 1.155 | / |
| P4R2 | 0 | / | / |
| P5R1 | 1 | 0.295 | / |
| P5R2 | 1 | 1.885 | / |
| P6R1 | 0 | / | / |
| P6R2 | 1 | 2.205 | / |

TABLE 15-continued

| | Number of Inflection Points | Position of Inflection Point 1 | Position of Inflection Point 2 |
|---|---|---|---|
| P7R1 | 2 | 0.685 | 3.075 |
| P7R2 | 2 | 1.135 | 4.915 |

TABLE 16

| | Number of Stationary Points | Position of Stationary Point 1 | Position of Stationary Point 2 |
|---|---|---|---|
| P1R1 | 0 | / | / |
| P1R2 | 0 | / | / |
| P2R1 | 2 | 2.605 | 4.585 |
| P2R2 | 0 | / | / |
| P3R1 | 0 | / | / |
| P3R2 | 1 | 1.765 | / |
| P4R1 | 0 | / | / |
| P4R2 | 0 | / | / |
| P5R1 | 1 | 0.515 | / |
| P5R2 | 0 | / | / |
| P6R1 | 0 | / | / |
| P6R2 | 0 | / | / |
| P7R1 | 2 | 1.245 | 4.335 |
| P7R2 | 1 | 2.615 | / |

Figure 14:
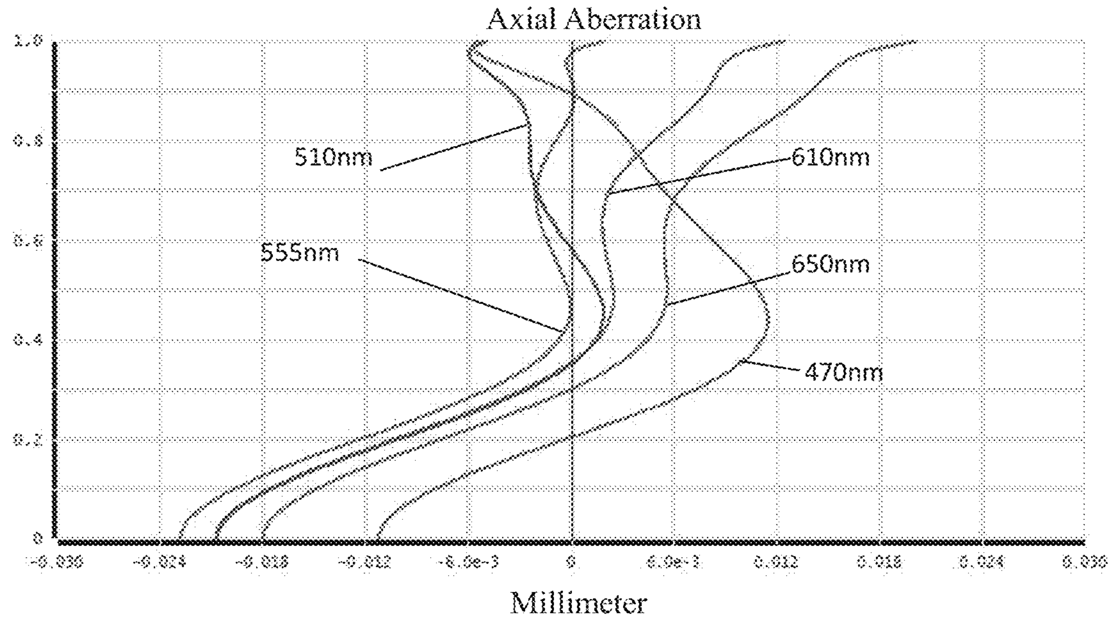
FIG. 14 is a schematic diagram showing the axial aberration of the camera optical lens shown in FIG. 13.
Figure 15:
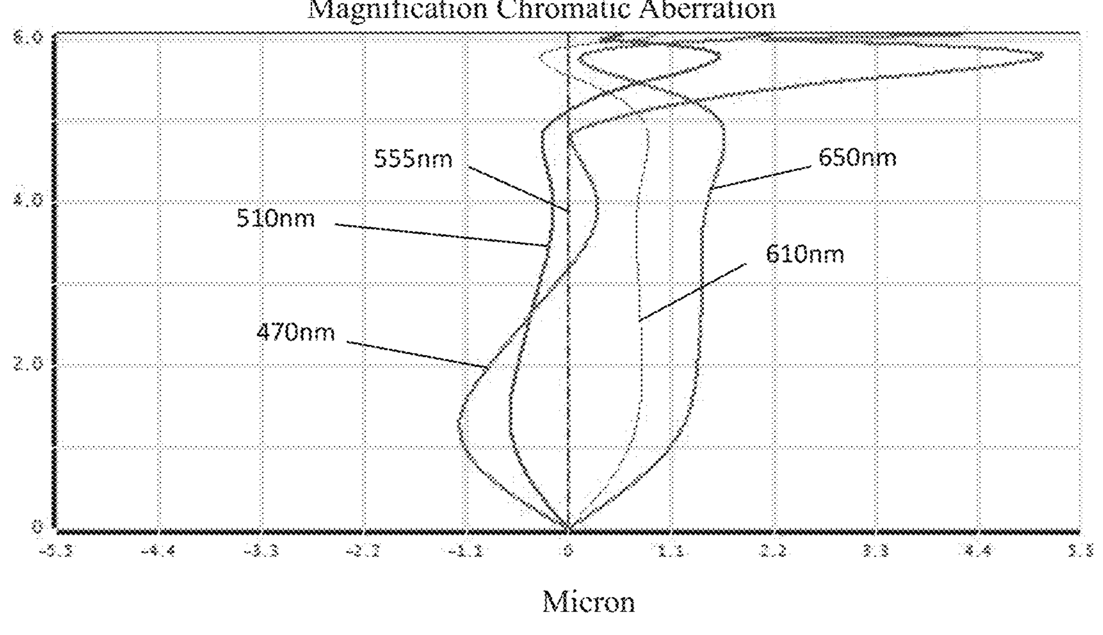
FIG. 15 is a schematic diagram showing the magnification chromatic aberration of the camera optical lens shown in FIG. 13.
Figures 16, 17:
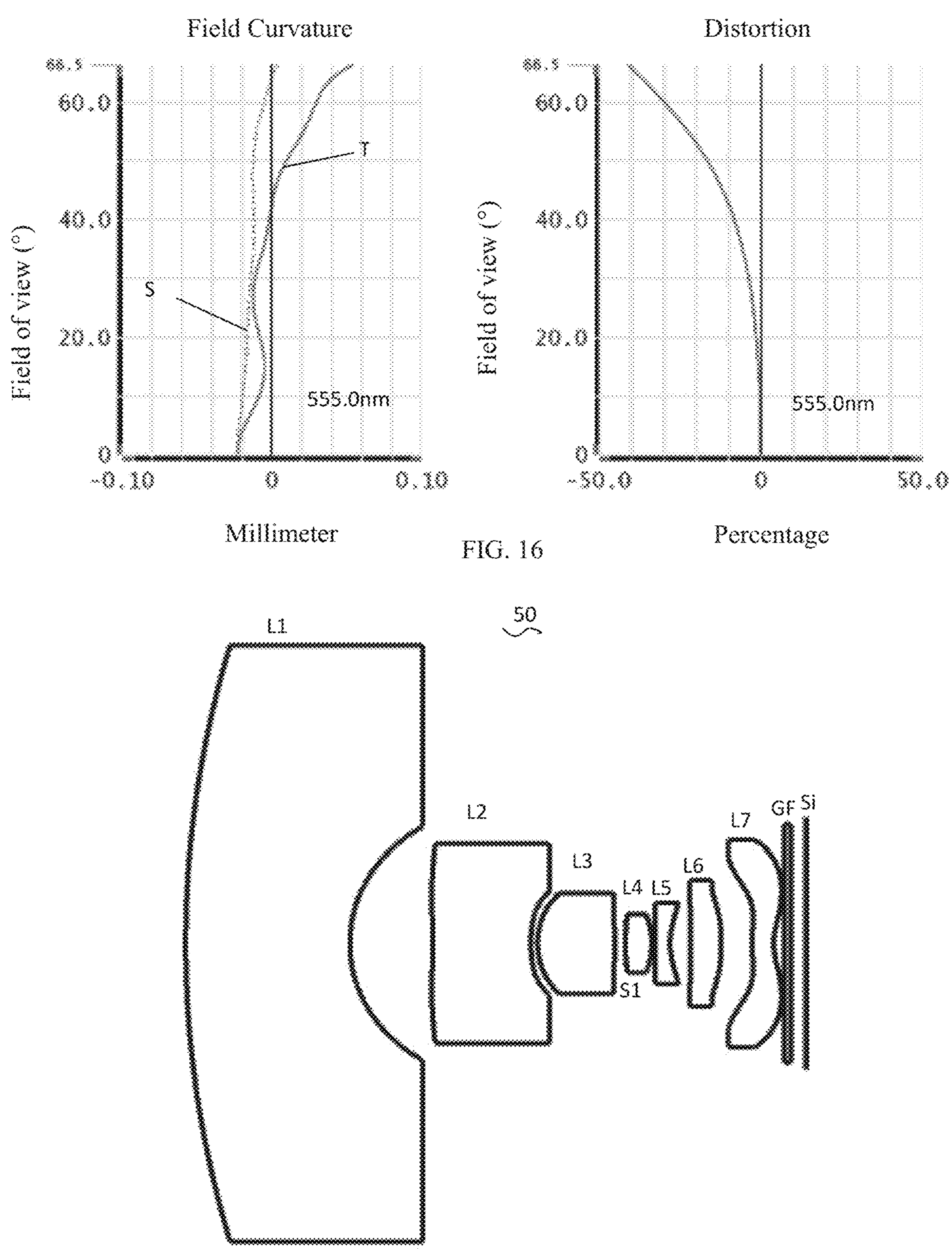
FIG. 16 is a schematic diagram showing the field curvature and distortion of the camera optical lens shown in FIG. 13.
FIG. 17 is a structural schematic diagram of the camera optical lens according to the fifth embodiment of the present application.

FIGS. 14 and 15 are schematic diagrams showing the axial aberration and magnification chromatic aberration of light with wavelengths of 470 nm, 510 nm, 555 nm, 610 nm, and 650 nm, respectively, after passing through the camera optical lens 40 according to the fourth embodiment. FIG. 16 is a schematic diagram showing the field curvature and distortion of light with a wavelength of 555.0 nm after passing through the camera optical lens 40 according to the fourth embodiment. The field curvature S of FIG. 16 is the field curvature in the arc-sagittal direction, and the field curvature T is the field curvature in the meridional direction.

As shown in Table 25, the fourth embodiment satisfies each of the relationship expressions.

In this embodiment, the camera optical lens 40 has an Entrance Pupil Diameter (ENPD) of 1.539 mm, a full field-of-view image height (IH) of 6.060 mm, a field of view (FOV) of 133.00° in the diagonal direction, and an aperture value FNO of 2.60. The camera optical lens 40 satisfies the design requirements of large aperture and ultra-wide angle and has excellent optical characteristics.

Fifth Embodiment

The fifth embodiment is basically the same as the first embodiment, and the meaning of the symbols is the same as that according to the first embodiment, and only the differences are listed below.

Tables 17 and 18 show the design data of the camera optical lens 50 according to the fifth embodiment of the present application.

TABLE 17

| | R | | d | | nd | | vd |
|---|---|---|---|---|---|---|---|
| S1 | ∞ | d0= | −19.960 | | | | |
| R1 | 55.183 | d1= | 7.412 | nd1 | 1.6385 | v1 | 55.47 |
| R2 | 6.744 | d2= | 3.738 | | | | |
| R3 | −37.982 | d3= | 4.437 | nd2 | 1.6610 | v2 | 20.53 |
| R4 | 8.107 | d4= | 0.304 | | | | |
| R5 | 3.985 | d5= | 3.469 | nd3 | 1.6153 | v3 | 25.94 |
| R6 | −371.217 | d6= | 0.490 | | | | |
| R7 | 7.033 | d7= | 1.195 | nd4 | 1.6192 | v4 | 63.85 |
| R8 | −4.529 | d8= | 0.147 | | | | |
| R9 | 13.028 | d9= | 0.683 | nd5 | 1.6610 | v5 | 20.53 |
| R10 | 3.647 | d10= | 0.934 | | | | |
| R11 | 8.933 | d11= | 1.377 | nd6 | 1.5346 | v6 | 55.69 |
| R12 | −12.595 | d12= | 1.387 | | | | |
| R13 | 6.132 | d13= | 0.983 | nd7 | 1.6153 | v7 | 25.94 |
| R14 | 3.228 | d14= | 0.474 | | | | |
| R15 | ∞ | d15= | 0.300 | ndg | 1.5233 | vg | 54.52 |
| R16 | ∞ | d16= | 0.701 | | | | |

TABLE 18

| | Cone Coefficient | Aspheric Coefficient | | | | |
|---|---|---|---|---|---|---|
| | k | A4 | A6 | A8 | A10 | A12 |
| R1 | | | | | | |
| R2 | | | | | | |
| R3 | 4.573E+01 | 1.714E−03 | −7.465E−05 | 4.905E−06 | −3.301E−07 | 1.819E−08 |
| R4 | −1.500E+00 | 1.021E−02 | −1.390E−03 | 6.768E−04 | −2.182E−04 | 5.592E−05 |
| R5 | 4.235E−01 | 3.462E−03 | −1.286E−03 | 3.670E−04 | −8.314E−05 | 2.016E−05 |
| R6 | −3.531E+05 | −8.517E−03 | −9.196E−04 | 5.140E−03 | −5.155E−03 | 3.098E−03 |
| R7 | −6.661E+00 | −1.090E−02 | −3.064E−04 | 1.397E−03 | −1.297E−03 | 6.276E−04 |
| R8 | −1.473E+01 | −2.960E−02 | 1.046E−02 | −3.952E−03 | 1.068E−03 | −1.531E−04 |
| R9 | 2.932E+01 | −2.617E−02 | 8.341E−03 | −3.193E−03 | 1.079E−03 | −2.893E−04 |
| R10 | −6.430E+00 | −4.773E−03 | 1.712E−03 | −4.559E−04 | 7.065E−05 | −9.461E−06 |
| R11 | −7.926E−03 | 3.373E−03 | −1.165E−03 | 3.423E−04 | −6.865E−05 | 8.956E−06 |
| R12 | −2.134E+00 | −1.306E−02 | 3.418E−03 | −7.412E−04 | 1.340E−04 | −1.630E−05 |
| R13 | −2.152E+01 | −2.130E−02 | 4.473E−04 | 3.352E−04 | −6.302E−05 | 6.130E−06 |
| R14 | −4.174E+00 | −1.765E−02 | 2.268E−03 | −2.163E−04 | 1.467E−05 | −7.019E−07 |

| | Cone Coefficient | Aspheric Coefficient | | | |
|---|---|---|---|---|---|
| | k | A14 | A16 | A18 | A20 |
| R1 | | | | | |
| R2 | | | | | |
| R3 | 4.573E+01 | −7.316E−10 | 1.847E−11 | −2.506E−13 | 1.396E−15 |
| R4 | −1.500E+00 | −9.201E−06 | 8.758E−07 | −4.382E−08 | 8.899E−10 |
| R5 | 4.235E−01 | −3.839E−06 | 4.130E−07 | −2.128E−08 | 4.256E−10 |

TABLE 18-continued

| | | | | | |
|---|---|---|---|---|---|
| R6 | −3.531E+05 | −1.132E−03 | 2.431E−04 | −2.812E−05 | 1.500E−06 |
| R7 | −6.661E+00 | −9.793E−05 | 2.467E−05 | −6.592E−06 | −2.509E−05 |
| R8 | −1.473E+01 | 1.757E−05 | 7.292E−07 | 1.992E−07 | −4.659E−08 |
| R9 | 2.932E+01 | 5.893E−05 | −8.096E−06 | 6.944E−07 | −3.986E−08 |
| R10 | −6.430E+00 | 9.446E−07 | −5.829E−08 | 4.487E−09 | −3.048E−10 |
| R11 | −7.926E−03 | −7.331E−07 | 3.360E−08 | −6.634E−10 | 0.000E+00 |
| R12 | −2.134E+00 | 1.404E−06 | −8.351E−08 | 2.810E−09 | −3.427E−11 |
| R13 | −2.152E+01 | −3.562E−07 | 1.229E−08 | −2.320E−10 | 1.835E−12 |
| R14 | −4.174E+00 | 2.270E−08 | −4.656E−10 | 5.473E−12 | −2.912E−14 |

Tables 19 and 20 show the design data of the inflection point and the stationary point of each lens in the camera optical lens 50 according to the fifth embodiment of the present application.

TABLE 19

| | Number of Inflection Points | Position of Inflection Point 1 | Position of Inflection Point 2 |
|---|---|---|---|
| P1R1 | 0 | / | / |
| P1R2 | 0 | / | / |
| P2R1 | 2 | 1.285 | 4.335 |
| P2R2 | 0 | / | / |
| P3R1 | 0 | / | / |
| P3R2 | 1 | 1.355 | / |
| P4R1 | 0 | / | / |
| P4R2 | 0 | / | / |
| P5R1 | 1 | 0.595 | / |
| P5R2 | 1 | 1.725 | / |
| P6R1 | 2 | 1.595 | 2.425 |
| P6R2 | 1 | 2.125 | / |
| P7R1 | 2 | 0.695 | 3.115 |
| P7R2 | 1 | 1.155 | / |

TABLE 20

| | Number of Stationary Points | Position of Stationary Point 1 |
|---|---|---|
| P1R1 | 0 | / |
| P1R2 | 0 | / |
| P2R1 | 1 | 2.375 |
| P2R2 | 0 | / |
| P3R1 | 0 | / |
| P3R2 | 0 | / |
| P4R1 | 0 | / |
| P4R2 | 0 | / |
| P5R1 | 1 | 1.155 |
| P5R2 | 0 | / |
| P6R1 | 1 | 2.225 |
| P6R2 | 1 | 2.975 |
| P7R1 | 1 | 1.255 |
| P7R2 | 1 | 2.605 |

Figure 18:
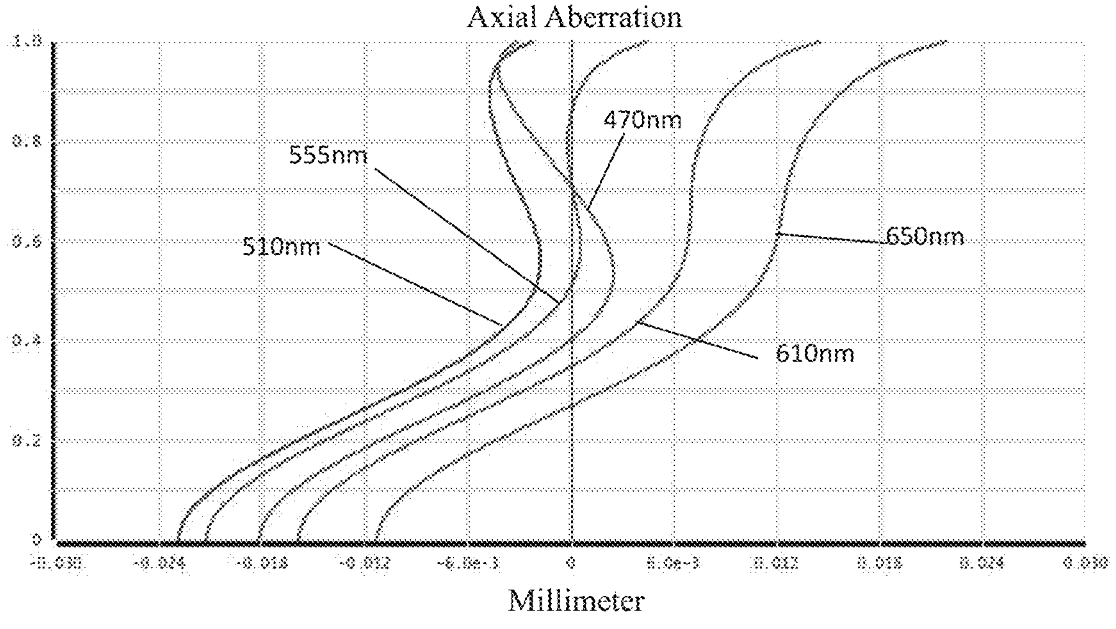
FIG. 18 is a schematic diagram showing the axial aberration of the camera optical lens shown in FIG. 17.
Figures 19, 20:
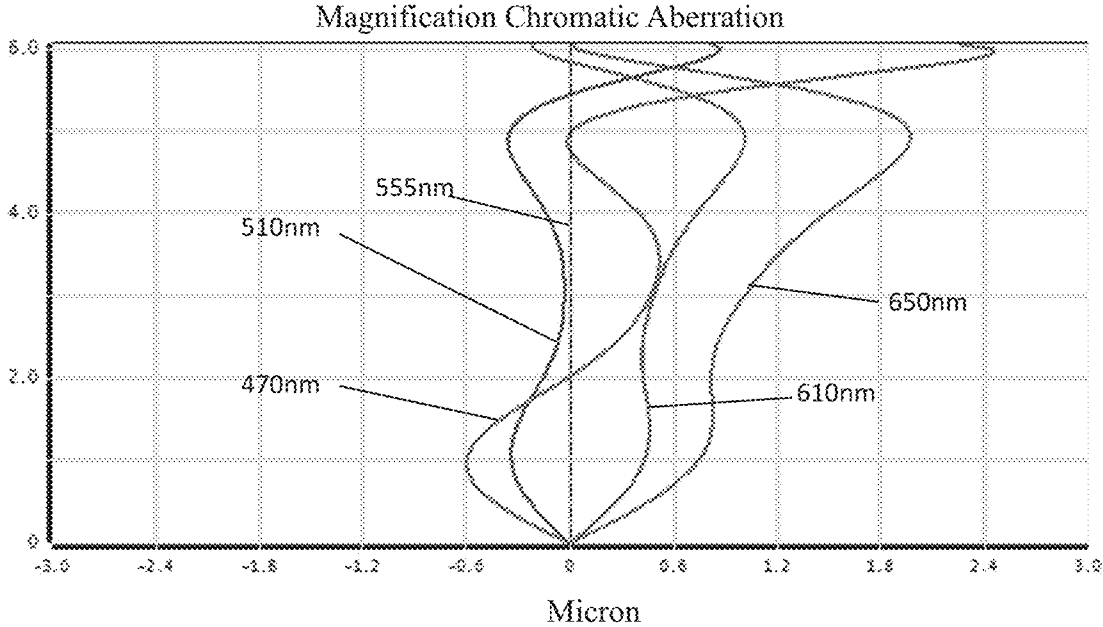
FIG. 19 is a schematic diagram showing the magnification chromatic aberration of the camera optical lens shown in FIG. 17.
FIG. 20 is a schematic diagram showing the field curvature and distortion of the camera optical lens shown in FIG. 17.
Figure 21:
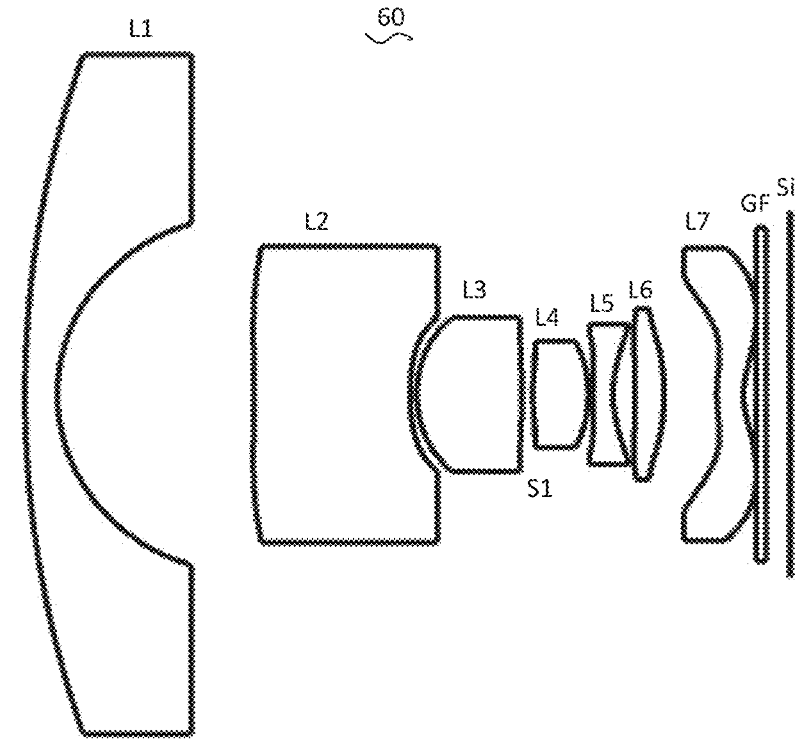
FIG. 21 is a structural schematic diagram of the camera optical lens according to a comparison example of the present application.

FIGS. 18 and 19 are schematic diagrams showing the axial aberration and magnification chromatic aberration of light with wavelengths of 470 nm, 510 nm, 555 nm, 610 nm, and 650 nm, respectively, after passing through the camera optical lens 50 according to the fifth embodiment. FIG. 20 shows a schematic diagram of the field curvature and distortion of light with a wavelength of 555.0 nm after passing through the camera optical lens 50 according to the fifth embodiment. The field curvature S of FIG. 20 is the field curvature in the arc-sagittal direction, and the field curvature T is the field curvature in the meridional direction.

As shown in Table 25, the fifth embodiment satisfies each of the relationship expressions.

In this embodiment, the camera optical lens 50 has an Entrance Pupil Diameter (ENPD) of 1.273 mm, a full field-of-view image height (IH) of 6.060 mm, a field of view (FOV) of 144.47° in the diagonal direction, and an aperture value FNO of 2.60. The camera optical lens 50 satisfies the design requirements of large aperture and ultra-wide angle and has excellent optical characteristics.

Comparison Example

The comparison example is basically the same as the first embodiment, the meaning of the symbols is the same as that according to the first embodiment, and only the differences are listed below.

Tables 21 and 22 show the design data of the camera optical lens 60 of the present proportions.

TABLE 21

| | R | | d | | nd | | vd |
|---|---|---|---|---|---|---|---|
| S1 | ∞ | d0= | −16.314 | | | | |
| R1 | 36.381 | d1= | 1.037 | nd1 | 1.6385 | v1 | 55.47 |
| R2 | 6.051 | d2= | 6.305 | | | | |
| R3 | −40.602 | d3= | 5.000 | nd2 | 1.6610 | v2 | 20.53 |
| R4 | 8.113 | d4= | 0.220 | | | | |
| R5 | 4.012 | d5= | 3.351 | nd3 | 1.6153 | v3 | 25.94 |
| R6 | −230.910 | d6= | 0.361 | | | | |
| R7 | 7.127 | d7= | 1.782 | nd4 | 1.6192 | v4 | 63.85 |
| R8 | −4.503 | d8= | 0.142 | | | | |
| R9 | 13.710 | d9= | 0.644 | nd5 | 1.6610 | v5 | 20.53 |
| R10 | 3.635 | d10= | 0.700 | | | | |
| R11 | 368.018 | d11= | 0.940 | nd6 | 1.5346 | v6 | 55.69 |
| R12 | −10.058 | d12= | 1.690 | | | | |
| R13 | 4.585 | d13= | 0.857 | nd7 | 1.6153 | v7 | 25.94 |
| R14 | 2.784 | d14= | 0.417 | | | | |
| R15 | ∞ | d15= | 0.300 | ndg | 1.5233 | vg | 54.52 |
| R16 | ∞ | d16= | 0.787 | | | | |

TABLE 22

| | Cone Coefficient | Aspheric Coefficient | | | | |
|---|---|---|---|---|---|---|
| | k | A4 | A6 | A8 | A10 | A12 |
| R1 | | | | | | |
| R2 | | | | | | |
| R3 | 4.309E+01 | 1.759E−03 | −7.361E−05 | 4.926E−06 | −3.294E−07 | 1.822E−08 |
| R4 | −1.733E+00 | 1.010E−02 | −1.425E−03 | 6.752E−04 | −2.186E−04 | 5.585E−05 |

TABLE 22-continued

| | | | | | | |
|---|---|---|---|---|---|---|
| R5 | 4.563E−01 | 3.478E−03 | −1.254E−03 | 3.694E−04 | −8.304E−05 | 2.019E−05 |
| R6 | −9.503E+01 | −8.147E−03 | −8.953E−04 | 5.084E−03 | −5.167E−03 | 3.096E−03 |
| R7 | −7.094E+00 | −1.083E−02 | 8.055E−05 | 1.525E−03 | −1.317E−03 | 5.829E−04 |
| R8 | −1.524E+01 | −2.974E−02 | 1.041E−02 | −3.996E−03 | 1.042E−03 | −1.638E−04 |
| R9 | 2.194E+01 | −2.751E−02 | 8.100E−03 | −3.226E−03 | 1.071E−03 | −2.912E−04 |
| R10 | −5.817E+00 | −4.564E−03 | 1.765E−03 | −4.422E−04 | 7.248E−05 | −9.328E−06 |
| R11 | 9.590E+01 | −7.882E−03 | 3.412E−03 | −1.163E−03 | 3.425E−04 | −6.860E−05 |
| R12 | −7.596E+00 | −1.296E−02 | 3.413E−03 | −7.414E−04 | 1.342E−04 | −1.629E−05 |
| R13 | −1.773E+01 | −2.174E−02 | 4.367E−04 | 3.349E−04 | −6.303E−05 | 6.130E−06 |
| R14 | −4.524E+00 | −1.747E−02 | 2.272E−03 | −2.169E−04 | 1.466E−05 | −7.018E−07 |

| | Cone Coefficient | Aspheric Coefficient | | | |
|---|---|---|---|---|---|
| | k | A14 | A16 | A18 | A20 |
| R1 | | | | | |
| R2 | | | | | |
| R3 | 4.309E+01 | −7.312E−10 | 1.847E−11 | −2.526E−13 | 1.295E−15 |
| R4 | −1.733E+00 | −9.211E−06 | 8.750E−07 | −4.386E−08 | 8.833E−10 |
| R5 | 4.563E−01 | −3.838E−06 | 4.120E−07 | −2.140E−08 | 4.178E−10 |
| R6 | −9.503E+01 | −1.130E−03 | 2.437E−04 | −2.813E−05 | 1.328E−06 |
| R7 | −7.094E+00 | −1.303E−04 | 1.069E−05 | −2.668E−07 | 7.215E−08 |
| R8 | −1.524E+01 | 1.351E−05 | −5.094E−07 | −7.933E−09 | −3.613E−09 |
| R9 | 2.194E+01 | 5.849E−05 | −8.185E−06 | 6.962E−07 | −2.781E−08 |
| R10 | −5.817E+00 | 9.144E−07 | −6.516E−08 | 3.295E−09 | −9.225E−11 |
| R11 | 9.590E+01 | 8.962E−06 | −7.323E−07 | 3.370E−08 | −6.593E−10 |
| R12 | −7.596E+00 | 1.405E−06 | −8.349E−08 | 2.809E−09 | −3.448E−11 |
| R13 | −1.773E+01 | −3.562E−07 | 1.229E−08 | −2.319E−10 | 1.841E−12 |
| R14 | −4.524E+00 | 2.270E−08 | −4.656E−10 | 5.473E−12 | −2.885E−14 |

Tables 23 and 24 show the design data of the inflection point and the stationary point of each lens in the camera optical lens 60 according to the comparison example of the present application.

TABLE 23

| | Number of Inflection Points | Position of Inflection Point 1 | Position of Inflection Point 2 |
|---|---|---|---|
| P1R1 | 0 | / | / |
| P1R2 | 0 | / | / |
| P2R1 | 2 | 1.195 | 4.725 |
| P2R2 | 0 | / | / |
| P3R1 | 0 | / | / |
| P3R2 | 1 | 1.495 | / |
| P4R1 | 1 | 1.075 | / |
| P4R2 | 0 | / | / |
| P5R1 | 1 | 0.535 | / |
| P5R2 | 1 | 2.035 | / |
| P6R1 | 2 | 0.175 | 1.495 |
| P6R2 | 1 | 2.095 | / |
| P7R1 | 2 | 0.725 | 3.275 |
| P7R2 | 1 | 1.145 | / |

TABLE 24

| | Number of Stationary Points | Position of Stationary Point 1 | Position of Stationary Point 2 |
|---|---|---|---|
| P1R1 | 0 | / | / |
| P1R2 | 0 | / | / |
| P2R1 | 1 | 2.175 | / |
| P2R2 | 0 | / | / |
| P3R1 | 0 | / | / |
| P3R2 | 0 | / | / |
| P4R1 | 0 | / | / |
| P4R2 | 0 | / | / |
| P5R1 | 1 | 0.985 | / |
| P5R2 | 0 | / | / |
| P6R1 | 2 | 0.305 | 1.985 |
| P6R2 | 0 | / | / |

TABLE 24-continued

| | Number of Stationary Points | Position of Stationary Point 1 | Position of Stationary Point 2 |
|---|---|---|---|
| P7R1 | 1 | 1.355 | / |
| P7R2 | 1 | 2.665 | / |

Figure 22:
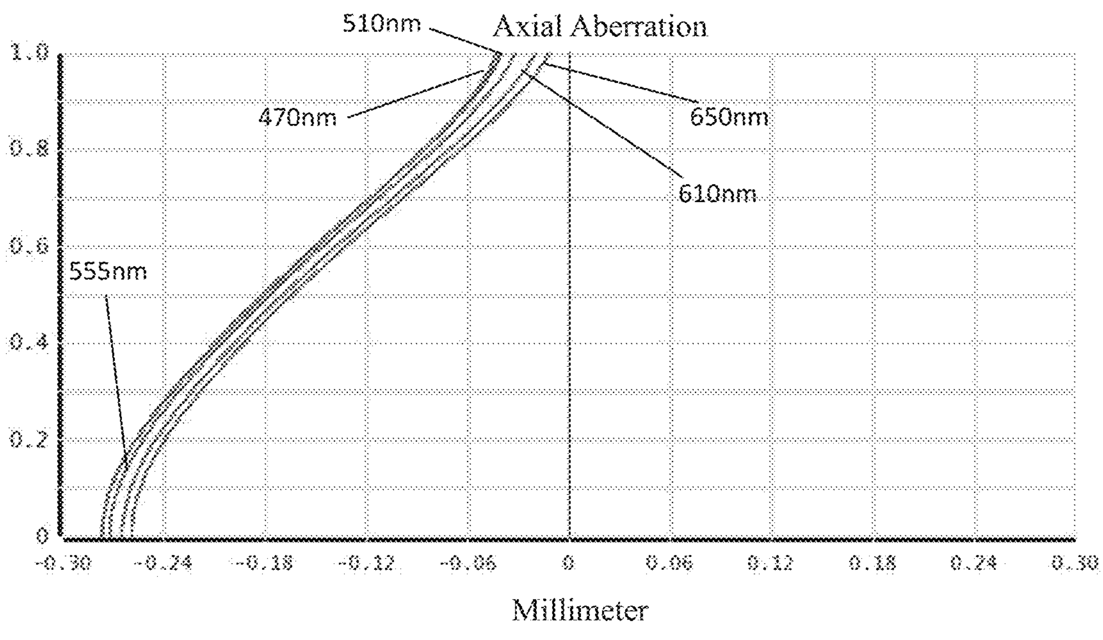
FIG. 22 is a schematic diagram showing the axial aberration of the camera optical lens shown in FIG. 21.
Figure 23:
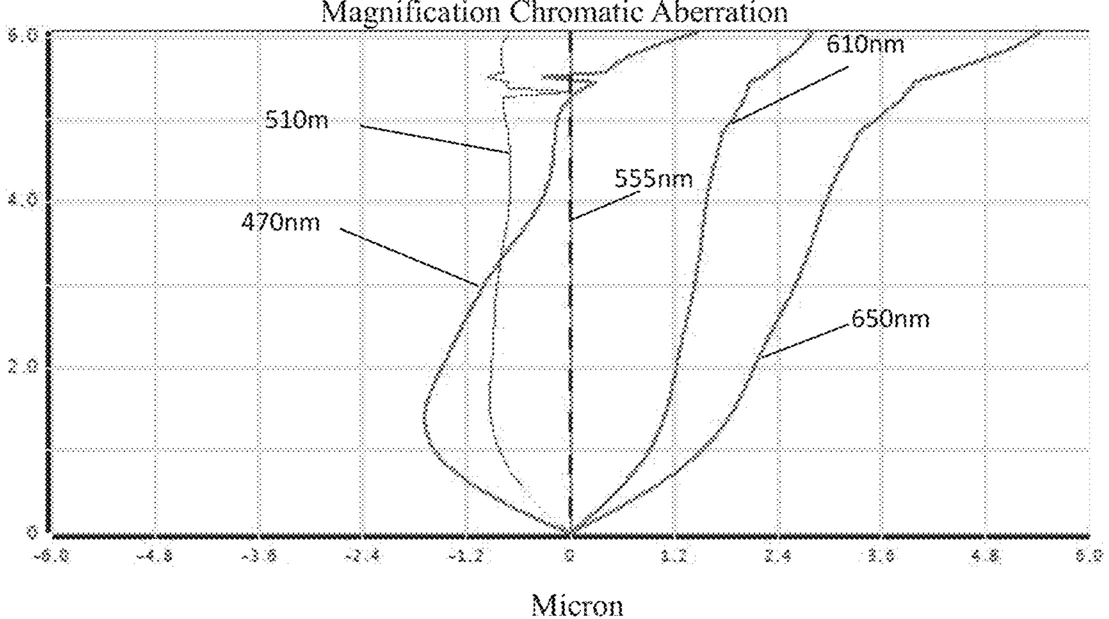
FIG. 23 is a schematic diagram showing the magnification chromatic aberration of the camera optical lens shown in FIG. 21.
Figure 24:
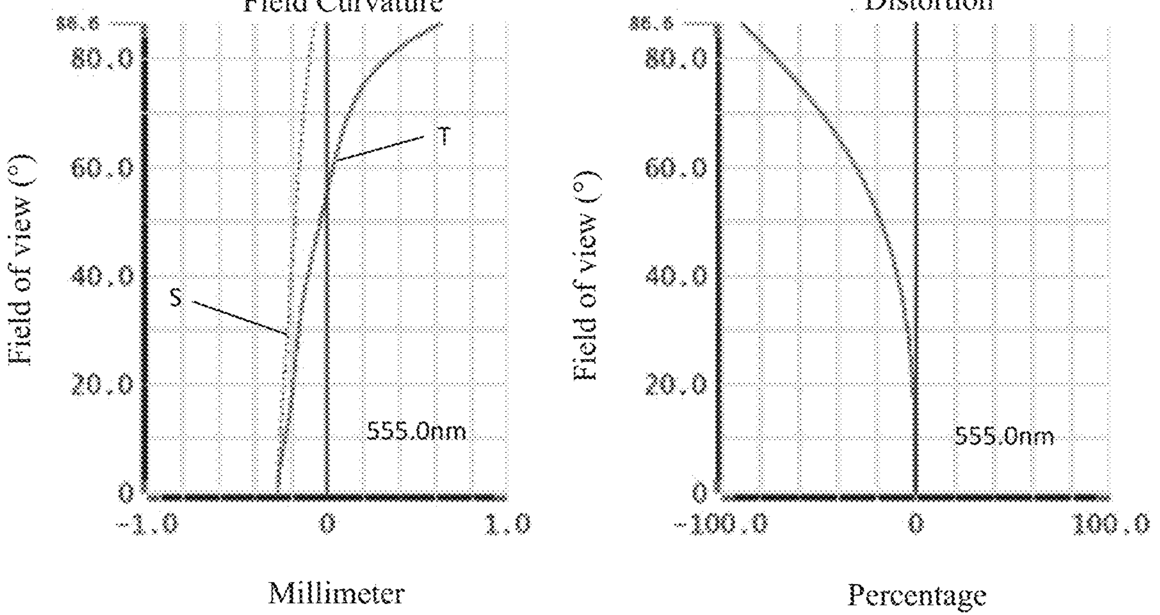
FIG. 24 is a schematic diagram showing the field curvature and distortion of the camera optical lens shown in FIG. 21.

FIGS. 22 and 23 are schematic diagrams showing the axial aberration and magnification chromatic aberration of light with wavelengths of 470 nm, 510 nm, 555 nm, 610 nm, and 650 nm, respectively, after passing through the scaled camera optical lens 60, respectively. FIG. 24, on the other hand, shows a schematic diagram of the field curvature and distortion of light having a wavelength of 555.0 nm after passing through the camera optical lens 60 of the comparison example. The field curvature S of FIG. 24 is the field curvature in the arc-sagittal direction, and T is the field curvature in the meridional direction.

Table 25 in the following lists the values corresponding to each of the relationship expressions in the comparison example in accordance with the above relationship expressions. It is clear that the camera optical lens 60 of the comparison example does not satisfy the above relationship expression $0.95 \leq f4/f \leq 1.40$.

In the comparison example, the camera optical lens 60 has an Entrance Pupil Diameter (ENPD) of 1.270 mm, a full field-of-view image height (IH) of 6.060 mm, a field of view (FOV) of 173.20° in the diagonal direction, and an aperture value FNO of 2.60. The camera optical lens 60 is not sufficiently compensated for various types of aberrations, and it lacks excellent optical characteristics.

TABLE 25

| Parameters and relationship expressions | First Embodiment | Second Embodiment | Third Embodiment | Fourth Embodiment | Fifth Embodiment | Comparison Example |
|---|---|---|---|---|---|---|
| f4/f | 1.19 | 1.35 | 0.96 | 1.12 | 1.40 | 1.43 |
| d11/d12 | 0.66 | 0.32 | 0.44 | 0.83 | 0.99 | 0.56 |
| R1/R2 | 6.20 | 7.00 | 11.94 | 3.04 | 8.18 | 6.01 |
| (R9 + R10)/(R9 − R10) | 1.690 | 1.695 | 3.172 | 1.210 | 1.778 | 1.722 |
| d7/d8 | 15.03 | 10.10 | 8.04 | 25.10 | 8.13 | 12.55 |
| f6/f | 4.29 | 4.63 | 7.98 | 4.97 | 3.01 | 5.53 |
| f | 3.999 | 3.535 | 4.760 | 4.001 | 3.311 | 3.302 |
| f1 | −11.807 | −11.178 | −13.939 | −15.144 | −12.754 | −11.483 |
| f2 | −9.744 | −9.809 | −8.803 | −9.782 | −9.649 | −9.742 |
| f3 | 6.436 | 6.430 | 6.868 | 6.263 | 6.386 | 6.400 |
| f4 | 4.752 | 4.760 | 4.571 | 4.477 | 4.619 | 4.721 |
| f5 | −7.512 | −7.552 | −17.345 | −6.360 | −7.825 | −7.615 |
| f6 | 17.144 | 16.361 | 37.993 | 19.880 | 9.967 | 18.270 |
| f7 | −12.745 | −11.483 | −8.435 | −10.953 | −12.641 | −13.979 |
| TTL | 23.175 | 24.925 | 34.887 | 23.820 | 28.031 | 24.533 |
| Fno | 2.60 | 2.60 | 2.60 | 2.60 | 2.60 | 2.60 |
| ENPD | 1.538 | 1.360 | 1.831 | 1.539 | 1.273 | 1.270 |
| IH | 7.000 | 6.060 | 6.060 | 6.060 | 6.060 | 6.060 |
| FOV | 155.65° | 178.00° | 150.55° | 133.00° | 144.47° | 173.20° |

It can be understood by those of ordinary skill in the art that each of the above embodiments is a specific embodiment for realizing the present application, and that various changes can be made thereto in form and detail in practical application without departing from the spirit and scope of the present application.

What is claimed is:

1. A camera optical lens, comprising in order from an objective side to an image side:

a first lens having a negative refractive force;

a second lens having a negative refractive force;

a third lens having a positive refractive force;

a fourth lens having a positive refractive force;

a fifth lens having a negative refractive force;

a sixth lens having a positive refractive force; and a seventh lens having a negative refractive force;

a focal length of the camera optical lens is f; a focal length of the fourth lens is f4; an on-axis thickness of the sixth lens is d11; an on-axis distance from an image surface of the sixth lens to an objective surface of the seventh lens is d12; a radius of curvature of an objective surface of the first lens is R1; a radius of curvature of an image surface of the first lens is R2; a radius of curvature of an objective surface of the fifth lens is R9; a radius of curvature of an image surface of the fifth lens is R10, a focal length of the sixth lens is f6, and the following relationship expressions are satisfied:

$$0.95 \leq f4/f \leq 1.40;$$

$$0.30 \leq d11/d12 \leq 1.00;$$

$$3.00 \leq R1/R2 \leq 12.00;$$

$$1.20 \leq (R9+R10)/(R9-R10) \leq 3.20;$$

$$3.00 \leq f6/f \leq 8.00.$$

2. The camera optical lens of claim 1, wherein an on-axis thickness of the fourth lens is d7; an on-axis distance from an image surface of the fourth lens to the objective surface of the fifth lens is d8, and the following relationship expression is satisfied:

$$8.00 \leq d7/d8 \leq 25.20.$$

3. The camera optical lens of claim 1, wherein the objective surface of the first lens is convex at a proximal-axis position, and an image surface of the first lens is concave at a proximal-axis position; a focal length of the first lens is f1; an on-axis thickness of the first lens is d1; a total track length of the camera optical lens is TTL, and the following relationship expressions are satisfied:

$$-7.70 \leq f1/f \leq -1.95;$$

$$0.03 \leq d1/TTL \leq 0.75.$$

4. The camera optical lens of claim 1, wherein an objective surface of the second lens is concave at a proximal-axis position, and an image surface of the second lens is concave at a proximal-axis position; a focal length of the second lens is f2; a radius of curvature of the objective surface of the second lens is R3; a radius of curvature of the image surface of the second lens is R4; an on-axis thickness of the second lens is d3; a total track length of the camera optical lens is TTL, and the following relationship expressions are satisfied:

$$-5.83 \leq f2/f \leq -1.23;$$

$$0.31 \leq (R3+R4)/(R3-R4) \leq 0.99;$$

$$0.05 \leq d3/TTL \leq 0.31.$$

5. The camera optical lens of claim 1, wherein an objective surface of the third lens is convex at a proximal-axis position; a focal length of the third lens is f3; a radius of curvature of the objective surface of the third lens is R5; a radius of curvature of an image surface of the third lens is R6; an on-axis thickness of the third lens is d5; a total track length of the camera optical lens is TTL, and the following relationship expressions are satisfied:

$$0.72 \leq f3/f \leq 2.89;$$

$$-2.29 \leq (R5+R6)/(R5-R6) \leq -0.61;$$

$$0.05 \leq d5/TTL \leq 0.22.$$

6. The camera optical lens of claim 1, wherein an objective surface of the fourth lens is convex at a proximal-axis position, and an image surface of the fourth lens is convex at a proximal-axis position; a radius of curvature of the objective surface of the fourth lens is R7, and a radius of curvature of the image surface of the fourth lens is R8; an on-axis thickness of the fourth lens is d7; a total track length of the camera optical lens is TTL, and the following relationship expressions are satisfied:

$$0.08 \leq (R7+R8)/(R7-R8) \leq 0.34;$$

$$0.02 \leq d7/TTL \leq 0.11.$$

7. The camera optical lens of claim 1, wherein the objective surface of the fifth lens is convex at a proximal-axis position, and the image surface of the fifth lens is concave at a proximal-axis position; a focal length of the fifth lens is f5; an on-axis thickness of the fifth lens is d9; a total track length of the camera optical lens is TTL, and the following relationship expressions are satisfied:

$$-7.29 \leq f5/f \leq -1.06;$$

$$0.01 \leq d9/TTL \leq 0.04.$$

8. The camera optical lens of claim 1, wherein the image surface of the sixth lens is convex at a proximal-axis position; a radius of curvature of an objective surface of the sixth lens is R11; a radius of curvature of the image surface of the sixth lens is R12; a total track length of the camera optical lens is TTL, and the following relationship expressions are satisfied:

$$-0.34 \leq (R11+R12)/(R11-R12) \leq 4.55;$$

$$0.01 \leq d11/TTL \leq 0.08.$$

9. The camera optical lens of claim 1, wherein the objective surface of the seventh lens is convex at a proximal-axis position, and an image surface of the seventh lens is concave at a proximal-axis position; a focal length of the seventh lens is f7; a radius of curvature of the objective surface of the seventh lens is R13; the radius of curvature of the image surface of the seventh lens is R14; an on-axis thickness of the seventh lens is d13; a total track length of the camera optical lens is TTL, and the following relationship expressions are satisfied:

$$-7.64 \leq f7/f \leq -1.18;$$

$$0.91 \leq (R13+R14)/(R13-R14) \leq 5.68;$$

$$0.01 \leq d13/TTL \leq 0.06.$$

10. The camera optical lens of claim 1, wherein a field of view of the camera optical lens is FOV, and the following relationship expression is satisfied:

$$FOV \geq 130.00°.$$

11. The camera optical lens of claim 1, wherein an aperture value of the camera optical lens is FNO, and the following relationship expression is satisfied:

$$FNO \leq 2.6.$$

12. The camera optical lens of claim 1, wherein the first lens is made of glass material.

13. The camera optical lens of claim 1, wherein the fourth lens is made of glass material.

* * * * *